US009836539B2

(12) United States Patent
Chiang et al.

(10) Patent No.: US 9,836,539 B2
(45) Date of Patent: Dec. 5, 2017

(54) CONTENT QUALITY FILTERING WITHOUT USE OF CONTENT

(75) Inventors: Meng-Fen Chiang, Chiayi County (TW); Wen-Chih Peng, Hsinchu (TW)

(73) Assignee: Yahoo Holdings, Inc., Sunnyvale, CA (US)

( * ) Notice: Subject to any disclaimer, the term of this patent is extended or adjusted under 35 U.S.C. 154(b) by 606 days.

(21) Appl. No.: 12/895,777

(22) Filed: Sep. 30, 2010

(65) Prior Publication Data

US 2012/0084282 A1 Apr. 5, 2012

(51) Int. Cl.
 *G06F 7/00* (2006.01)
 *G06F 17/30* (2006.01)
 *G06F 17/00* (2006.01)

(52) U.S. Cl.
 CPC .. *G06F 17/30864* (2013.01); *G06F 17/30144* (2013.01); *G06F 17/30899* (2013.01)

(58) Field of Classification Search
 CPC ............ G06F 17/30864; G06F 17/30899
 USPC ............................ 707/725, 999.001–999.005
 See application file for complete search history.

(56) References Cited

U.S. PATENT DOCUMENTS 6,430,558 B1 * 8/2002 Delano
7,685,021 B2 * 3/2010 Kumar et al. ................ 705/26.2
2002/0198882 A1 * 12/2002 Linden .............. G06F 17/30867
                                                    707/999.01
2006/0190225 A1 * 8/2006 Brand ............................... 703/2
2008/0243632 A1 * 10/2008 Kane et al. ................. 705/26
2008/0281808 A1 * 11/2008 Anderson et al. ........... 707/5
2009/0164516 A1 * 6/2009 Svendsen et al. ......... 707/104.1
2010/0241647 A1 * 9/2010 Ntoulas et al. .............. 707/765
2010/0281022 A1 * 11/2010 Gollapudi et al. ........... 707/723

* cited by examiner

*Primary Examiner* — Kannan Shanmugasundaram
(74) *Attorney, Agent, or Firm* — Martine Penilla Group, LLP

(57) ABSTRACT

Methods and system for providing a list of recommended items in response to a query includes obtaining user navigation information relevant to the query from a plurality of user access logs associated with the plurality of users. The user access logs define the navigation sequence followed by a plurality of users for a plurality of queries. The navigation sequence represents the users browsing behavior and identifies answers to the queries. A set of temporal parameters for analyzing the user navigation information is identified. The temporal parameters define time frame for analyzing the user navigation information. A list of recommended items to navigate is dynamically generated by analyzing user navigation information obtained from user access logs using temporal parameters. The generated list includes items that are most relevant to the query. The generated list of items is returned in response to the query and represents an optimal result.

21 Claims, 15 Drawing Sheets

Paralleling Random Walk with Restart

- With multiple query

|  | Node 4 | Node 5 |
|---|---|---|
| Node 1 | 0.13 | 0.08 |
| Node 2 | 0.10 | 0.08 |
| Node 3 | 0.13 | 0.08 |
| Node 4 | 0.21 | 0.12 |
| Node 5 | 0.13 | 0.21 |
| Node 6 | 0.05 | 0.10 |
| Node 7 | 0.05 | 0.10 |
| Node 8 | 0.07 | 0.10 |
| Node 9 | 0.04 | 0.04 |
| Node 10 | 0.03 | 0.03 |
| Node 11 | 0.04 | 0.04 |
| Node 12 | 0.02 | 0.02 |

Paralleling RWR With Multiple Queries

- Diffusion score for each item w.r.t. $q$ $$F_{i,j} = \begin{cases} c \times A_{q,i} \times M_{i,j} & \text{if } e_{i,j} \in E \\ (1-c) \times A_{q,i} & \text{if } v_j \text{ is the query node } q \end{cases} \quad (4)$$

- Sum up diffusion scores for each item w.r.t. $q$ $$A_{q,j} = \sum_i F_{i,j} \quad (5)$$

Figure 7

CONTENT QUALITY FILTERING WITHOUT USE OF CONTENT

BACKGROUND

Field of the Invention

The present invention relates to assessing content quality in relation to a query, and more particularly, assessing content quality by analyzing user behavior in order to provide a recommendation list of entries in response to the query.

Description of the Related Art

Rapid growth in the amount of data available on the Internet has made information retrieval increasingly challenging for users. One of the key challenges for the user is to find the right data in a fast and efficient manner through data mining. Conventional data mining approaches have used techniques, such as content-based search, to explore relevance and to recommend appropriate items from user-generated content (UGC). Content-based search is a technique wherein the system utilizes information available in the documents in a holistic manner to determine what the user might be interested in and to predict items based on this determination. The system then filters and parses the contents to provide results that closely match user intentions. The system relies on content included in the documents for such data mining.

A key challenge in using the content-based search technique is that the mined data is noisy and biased. For instance, two different pictures of a same scene would be represented differently in digital format even though they may have a lot of similarity. Further, when contents from different languages are to be analyzed, the algorithm may have difficulties in handling natural language-based processing. This might be due to the fact that the contextual usage of certain text in one language may be different from the way the same text is used in another language. In addition to the contextual differences, ambiguity with misspelled words plays a significant part in the content-based search. In other words, the context-based algorithm is both text dependent and domain dependent.

It is essential to provide an effective and efficient framework for mining data so as to make the results less noisy and biased. In order to provide a more effective and efficient tool, it is desirable to have a text independent and domain independent algorithm so that the algorithm can be ported across all domains with the same degree of success in data mining across the board.

It is in this context that the embodiments of the invention arise.

SUMMARY

Embodiments of the present invention describe an algorithm for mining data and to provide a list of recommended items in response to a query that is less noisy and biased. The algorithm enables data mining that is both text independent and domain independent enabling the algorithm to be ported across all domains with the same degree of success in data mining across the board.

The algorithm provides a rich data-mining tool for generating an optimal list of recommended items in response to a query. The algorithm obtains user navigation information relevant to the query from a plurality of user access logs, identifies a set of temporal parameters and dynamically generates an optimal list of recommended items to navigate to in response to the query. The algorithm generates the recommended list of items by analyzing the user navigation information using the temporal parameters and identifying items in the form of query/answer pairs. The identified items reflect the most optimal navigation sequence followed by a plurality of users for the query.

It should be appreciated that the present invention can be implemented in numerous ways, such as, methods, systems and an apparatus. Several inventive embodiments of the present invention are described below.

In one embodiment, a method for providing an optimal list of recommended items in response to a query is disclosed. The method includes obtaining user navigation information relevant to the query from a plurality of user access logs associated with the plurality of users. The user access logs define the navigation sequence followed by a plurality of users for a plurality of queries. The navigation sequence represents the users browsing behavior and identifies relevant items that the users navigated to for each of the queries. A set of temporal parameters for analyzing the user navigation information is identified. The temporal parameters define time frame for analyzing the user navigation information. An optimal list of recommended items to navigate is dynamically generated in response to the query. The list is generated by identifying a set of items most relevant to the query by analyzing user navigation information obtained from user access logs using temporal parameters and returning the identified set of items in response to the query.

In another embodiment, a computer-implemented system configured to execute a recommendation algorithm is disclosed. The recommendation algorithm includes logic to provide an optimal list of recommended items in response to a query. The recommendation algorithm includes a temporal pattern mining module, a graph execution module and a random walk module. The temporal pattern mining module is configured to access and analyze a plurality of user access logs of a plurality of users using a set of temporal parameters and to identify a set of items that match the query. The identified set of items reflects temporal patterns established by the plurality of users in response to the query. The graph execution module is configured to generate a graph using the plurality of items identified by the temporal pattern mining module. The graph execution module is also configured to compute conditional count for each pair of nodes in the graph. The generated graph includes a plurality of nodes and a plurality of edges connecting the nodes wherein the nodes represent items and the edges between nodes represent the corresponding conditional counts associated with the nodes. The random walk module computes relevance score for each of the nodes in the graph. The relevance score for each node defines the relevancy weight of the item represented in that node to the query. The relevance score of the item is iteratively refined and the refined relevance score of each item is used to identify the most relevant items for inclusion in the optimal list of recommended items in response to the query. The items are returned in the form of a query/answer pair in response to the query.

In yet another embodiment, a method for generating an optimal list of recommended results for a query is disclosed. The method includes obtaining user navigation information relevant to the query from a plurality of user access logs. The user access logs define navigation sequence representing the browsing behavior of the plurality of users for a plurality of queries. The navigation sequence identifies items relevant to each of the plurality of queries. A set of temporal parameters defining time frame for analyzing users browsing behavior is identified. The temporal parameters include a bin size and a window size. The bin size is defined as a calibration unit for scaling a raw time-stamp associated with each of the items in the user access logs and the window size is defined as a time frame for determining users browsing behavior for a particular query. An optimal list of recommended items to navigate in response to the query is dynamically generated. The optimal list of recommended items is obtained by analyzing user navigation information relevant to the query using the temporal parameters. Each of the items in the generated list of recommended items represents a pair including the query and an answer to the query. The generated list of recommended items for the query is refined based on additional navigation information obtained from subsequent dynamic mining of user access logs based on bin size. The refined list of recommended items is returned in response to the query.

Thus, the embodiments of the invention provide an effective and efficient tool that focuses on the plurality of users navigation behavior as recorded in the user access logs rather than basing the algorithm on context or domain of the query. By focusing on the user behavior, the query results are normalized in a more efficient manner thereby removing the ambiguity that generally plagues a context-based query algorithm. The user behavior dependent algorithm makes this algorithm portable across all domains while providing an improved set of optimal results across the domains.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings.

FIG. 7 illustrates a sample algorithm used in computing diffusion score and relevance score, in one embodiment of the invention.

DETAILED DESCRIPTION

Broadly speaking, the embodiments of the present invention provide methods, apparatus and systems for generating a list of recommended items in response to a query. The list of recommended items is most relevant to the query and includes the query and answers to the query in a query/answer pair format. The items in the recommended list are presented to a user to navigate in an order of relevance to the query. The generated list of items is context independent and domain independent and can be ported across all domains making the present invention a more robust and effective search recommendation tool.

The various embodiments of the invention provide details of using a recommendation algorithm to mine a plurality of users navigation data by accessing a plurality of user access logs and generating an optimal list of recommended items for a user to navigate to in response to the query from a user. The recommended list identifies the most popular items that a majority of the plurality of users previously navigated to for the same query. The algorithm follows different users browsing pattern rather than context-based approach in generating the recommended list of items for a user to navigate. This type of approach enables the algorithm to be more domain independent that is highly portable across all domains while providing the most relevant items to the query.

Towards this end, the embodiments define a system equipped with a recommendation algorithm that is configured to obtain user navigation information of a plurality of users and to analyze the user navigation information using a set of temporal parameters to determine which of the items in the navigation information provide the most relevant temporal relation to the query. Each item in the relevant items list is represented as a query/answer pair. The algorithm returns the optimal list of recommended items in response to the query. The recommended list of items returned represent the most popular items accessed by majority of users. The algorithm tracks plurality of users navigation behavior for specific queries by dynamically mining the respective user's access logs to generate an optimal list of items that reflects both high item-precision and high item-recall search result. The algorithm is also cost-effective as the computational cost of mining the navigation data using the algorithm is significantly cheaper. The computational cost is further reduced with parallel processing. Other features and advantages will become apparent from the description of the various figures as set forth herein.

It should be understood that the recommendation algorithm can be in the form of a code running on one or more servers, or can be embedded in a hardware or firmware. The recommendation algorithm does not have to be integrally coupled to the server but be available to the server. Towards this end, the various embodiments of the invention will now be described in detail with reference to the drawings.

Figure 1A:
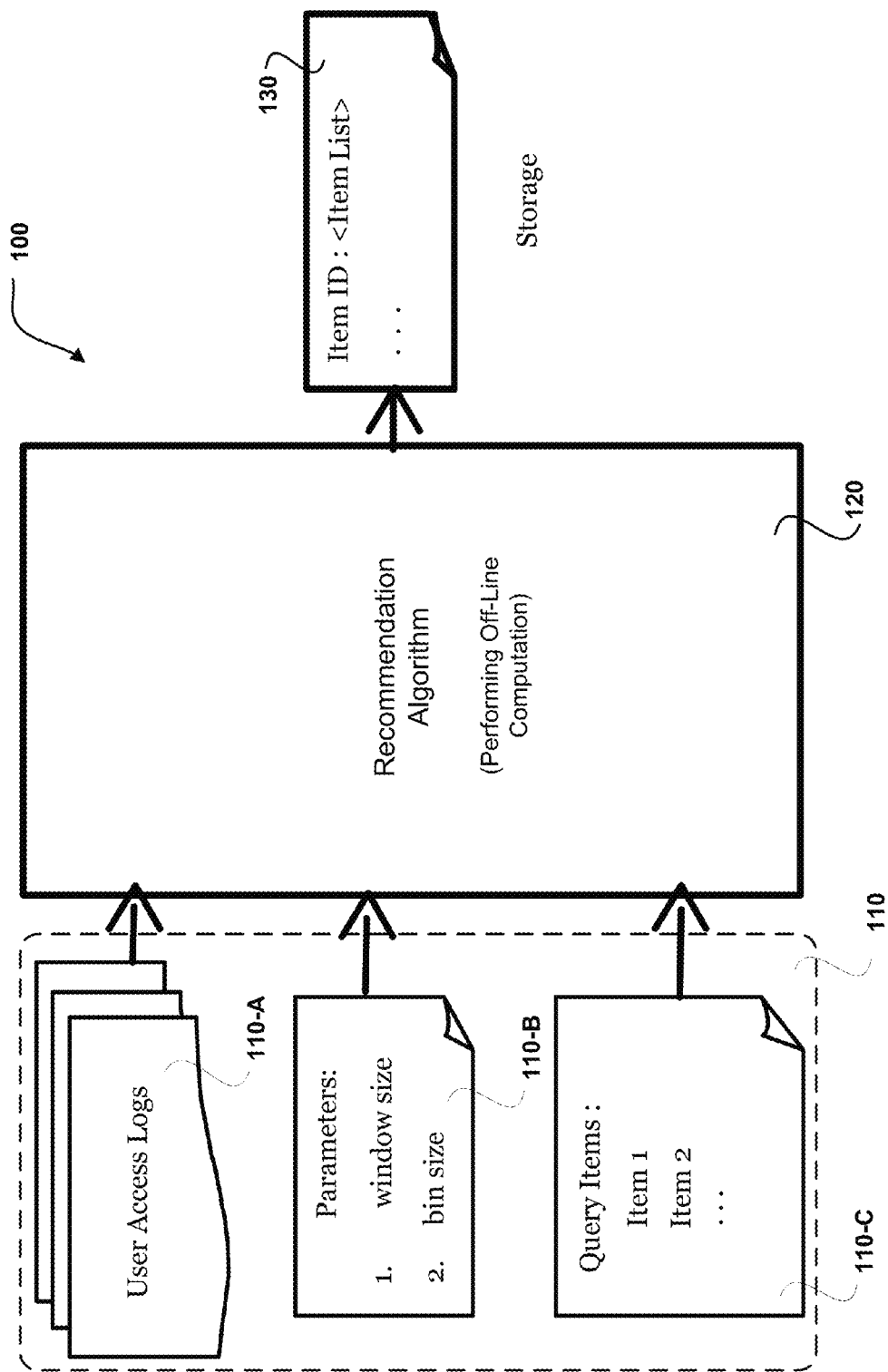
FIG. 1A illustrates a basic high-level block diagram of a system equipped with a recommendation algorithm for providing a recommended list of items for a query, in one embodiment of the invention.

FIG. 1A illustrates a high-level block diagram of a computer system that is configured to execute a recommendation algorithm used to generate a list of recommended items in response to a query, in one embodiment of the invention. Although the embodiment is described with reference to a specific computer system, it should be noted that the computer system embodying a recommendation application could be specially constructed for executing the recommendation algorithm. Additionally, the recommendation algorithm may be incorporated in a computer readable medium that can be read and executed by a computer system.

Referring to FIG. 1A, the computer system includes a server-computing device (server) 100 that is configured to receive a query forwarded from a client-computing device (not shown) over a network, such as an Internet. A user at the client-computing device enters the query, which is forwarded by the client-computing device to the server-computing device. The server 100 is equipped with an interface to interact with the client-computing device to receive the query and to return a set of items in response to the query. The server 100 is equipped with a recommendation algorithm 120 that receives inputs 110 from various sources and generates an optimal list of recommended items 130 for the query over time. One of the inputs 110 received by the algorithm 120 is the query 110-C forwarded by the client computing device (client) through the network. Upon receipt of a query from a client, the recommendation algorithm at the server-computing device retrieves a pre-computed list of recommended items corresponding to the query and returns the items list to the client-computing device in response to the query. In one embodiment, the recommendation algorithm dynamically mines the user access logs off-line to identify items received at the server-computing device, analyzes the identified items and generates the pre-computed list of items for each of the queries. The generated, pre-computed list of items is stored in a storage device and dynamically refined to reflect changes in the user access logs associated with each of the queries, over time. In one embodiment, the pre-computed list of items is stored in the storage device as text. In another embodiment, the pre-computed list of items is stored in a database in the storage device. Other forms of storing the pre-computed list of items may be engaged so long as the pre-computed list of items can be refined, parsed, updated and are suitable for rendering.

In order to generate a pre-computed list of recommended items for a query, the recommendation algorithm retrieves a set of temporal parameters 110-B and accesses a plurality of user access logs 110-A of a plurality of users to retrieve navigation information related to each of the queries received at the server-computing device. The temporal parameters, in one embodiment, may be stored in a storage device on the server 100 and accessed by the algorithm 120. In another embodiment, the temporal parameters may be stored in a database on a storage device that is external to the server but accessible to the algorithm 120. Irrespective of where the temporal parameters are stored and how they are accessed, the temporal parameters 110-B define a time frame for analyzing the user navigation information of the plurality of users obtained from the user access logs. In one embodiment, the temporal parameters 110-B include at least a window size and a bin size. It should be noted that the aforementioned temporal parameters are exemplary and should not be considered restrictive. Additional temporal parameters may be used as seen fit. In one embodiment, the window size is defined as a time frame for determining a user's browsing behavior for a particular query and the bin size is defined as a calibration unit for scaling a raw time-stamp associated with each item. For instance, if the bin size is defined to be "5", then a raw time-stamp of "53" will be mapped to a corresponding scale of "51~55". In addition to the window size and the bin size, the recommendation algorithm may use a pre-defined update frequency that defines the time period for mining the plurality of users navigation information from the plurality of user access logs. In one embodiment, the update frequency is part of the temporal parameters. In another embodiment, the update frequency is defined by a default value, such as daily or hourly, etc. In one embodiment, the bin size and the window size are pre-defined, static values for all types of queries. In another embodiment, the bin size and the window size may vary depending on the nature of the query.

Referencing back to FIG. 1A, the user access logs may be stored in one or more user access log databases and made available to the recommendation algorithm 120 executing on a processor of the server 100 during off-line. In one embodiment, the user access logs are stored in a plurality of user access log databases that may be distributed across a plurality of servers and the recommendation algorithm 120 is provided access to these databases spread across multiple servers. In another embodiment, the user access logs maybe stored in a single user access log database that is accessed by the algorithm 120. In yet another embodiment, the user access log database is external to the server but accessible by the algorithm 120. The user access log provides behavioral patterns established by the plurality of users for a plurality of queries. The algorithm 120 mines the user access logs to extract a subset of log entries that are related to the query. Each log entry provides the query and an answer to the query as a query/answer pair. The query/answer pair is represented as an "item". The algorithm extracts a subset of items that are related to the query from the plurality of user access logs. The subset of items extracted are analyzed using the temporal parameters to determine the temporal relation of the items to the query item and an optimal list of recommended items 130 is generated from the subset of items related to the query and returned to the client in response to the query.

In one embodiment, the list of recommended items that is dynamically generated may be stored in an items database within in a storage device accessible to the algorithm 120 and periodically refined. In one embodiment, the list of recommended items is refined based on the bin size. The bin size is used to align time-stamps of each entry in the user access logs for data mining and data refining during generation and refinement of the list of recommended items. For instance, if the bin size is 10 seconds, then the algorithm will first mine the plurality of user access logs to identify log entries that match the query, then align the identified log entries according to bin size, for eg., 10 seconds, in order to determine the navigation behavior of the plurality of users for the query and to refine the list of recommended items stored in the database. Accordingly, a subset of items that best match the query is identified based on the parsing/periodic parsing of the user access logs and the identified subset of items is aligned according to bin size and the aligned subset of items is used in generating a new pre-computed list of recommended items or refining the existing list of recommended items. The pre-computed, refined list of recommended items is presented to a user upon receipt of a subsequent query request from the user.

Figure 1B:
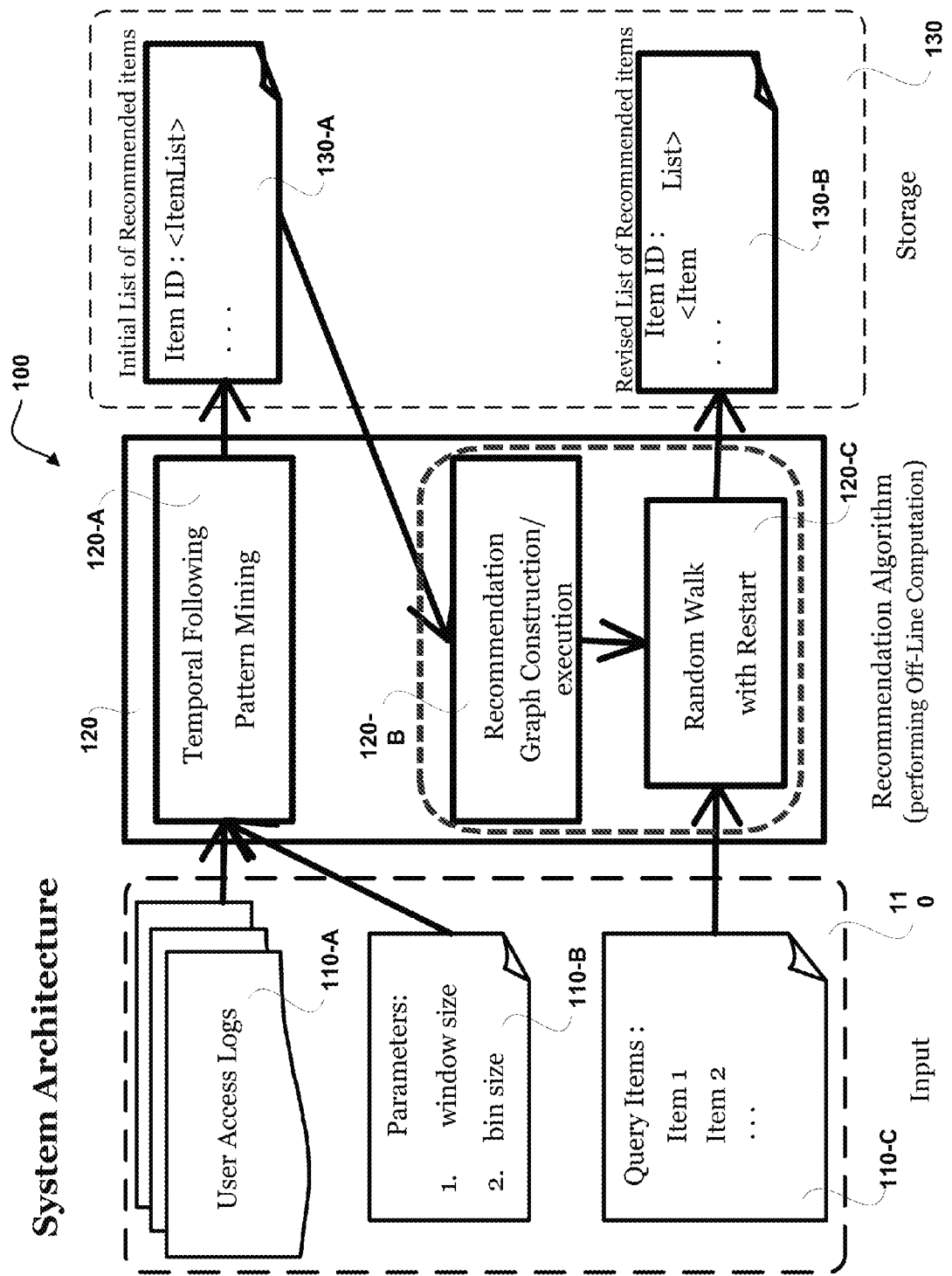
FIG. 1B illustrates a block diagram of the various modules within the recommendation algorithm and their interaction with other modules, in one embodiment of the invention.

FIG. 1B illustrates the various modules of the recommendation algorithm 120 and their interactions with other modules during the generation of a list of recommended items for a query from a user, in one embodiment of the invention. To assist in the generation of the optimal, pre-computed list of recommended items, the recommendation algorithm 120 includes a plurality of modules including a temporal following pattern mining module (also termed "mining module") 120-A, a recommendation graph execution module (also termed "graphing module") 120-B and a random walk with restart module (also termed "RWR" module) 120-C. The modules within the recommendation algorithm 120 are exemplary and are not restrictive. The functions of the various modules of the recommendation algorithm 120 are described hereunder in greater detail.

The mining module 120-A is configured to access a plurality of user access logs 110-A of a plurality of users in response to a previously received query at the server-computing device and extract a subset of items from the user access logs that are related to the query. In addition to extracting the subset of items, the mining module 120-A identifies and retrieves a set of temporal parameters. The temporal parameters are used to analyze the extracted subset of items to determine the temporal relation of the items to the query based on the users' browsing behavior. The temporal parameters define the time frame for analyzing the subset of items in determining the temporal patterns established by the users' browsing behavior and to determine the temporal relation of the extracted subset of items to the query. The mining module generates an initial list of recommended items (also termed "initial list") 130-A as a result of the analysis.

Figure 2:
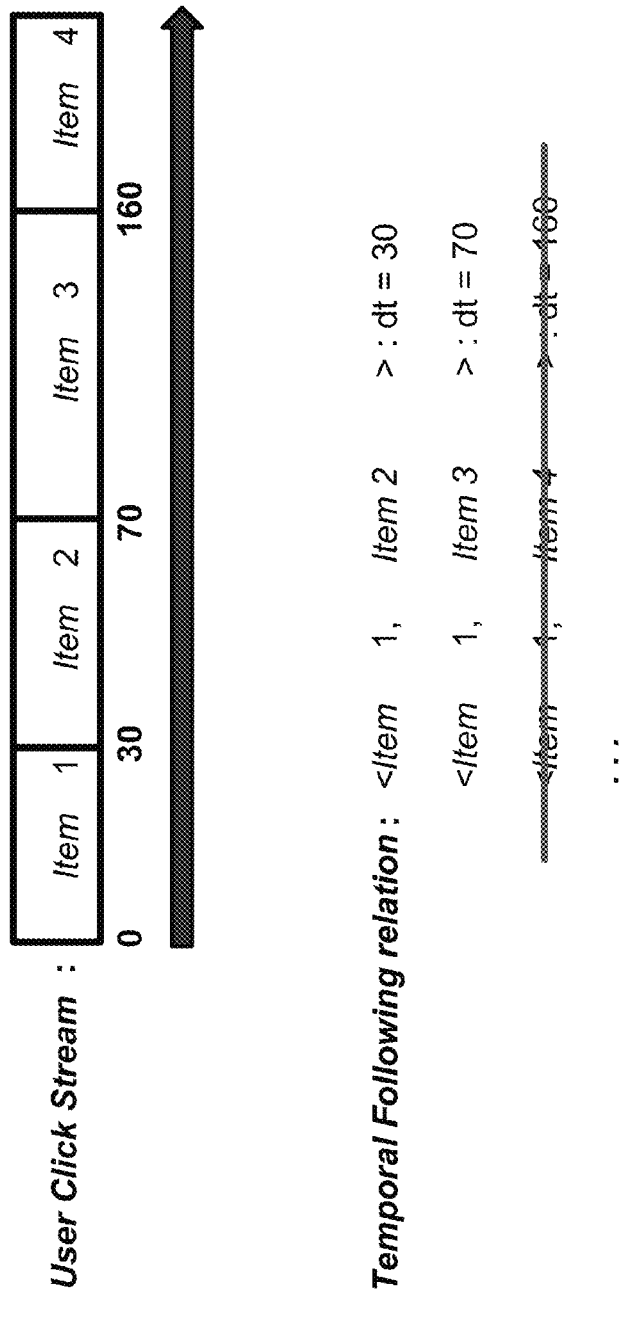
FIG. 2 illustrates an example of a temporal following relation for an item related to a query, in one embodiment of the invention.

The logic used by the mining module in determining the temporal relation of the subset of items will now be explained with reference to FIG. 2. FIG. 2 illustrates a subset of items related to a query extracted from a user access log of a particular user. The extracted subset of items is represented in FIG. 2 as a sample user click stream, which identifies a user's browsing pattern in relation to the query. One can construe from looking at the user click stream that the user, in response to the query, accessed item 1, followed by item 2, item 3 and item 4 in that order. Further, as seen from the user click stream, the user accessed item 2 about 30 seconds after he accessed item 1, item 3 about 70 seconds after accessing item 1, and item 4 about 160 seconds after accessing item 1. In the sample click stream depicted in FIG. 2, item 1 is considered to be the first item that the particular user accessed in response to the query. As a result, item 1 is shown as having been accessed at 0 seconds, implying that item 1 represents the beginning of the user click stream for the query. For illustrative purposes, FIG. 2 depicts a single user click stream used by the mining module in generating an initial list of recommended items.

Returning to FIG. 2, the mining module 120-A uses this click stream to analyze and identify all the items that follow a temporal pattern with item 1. The mining module 120-A accomplishes this by first identifying a set of temporal parameters for the analysis. The temporal parameters, as has been described earlier, include at least a pre-defined window size and a bin size. The mining module 120-A identifies all the items that fall within the window size by determining the access time of each item with respect to the initial item in the user click stream. Access time, represented by "dt" (delta time) in FIG. 2, is defined as the time lapsed from the time the user accessed a first item (item 1) to the time the user accessed a successive item (item 2, item 3, item 4, . . . ), to identify the items in the user click stream that fall within the pre-defined window size. The mining module 120-A may use the bin size to align all of the identified items related to the query and then use the access time to identify the temporal relation of the items to the query item. In the embodiment illustrated in FIG. 2, the window size is defined to be 150 seconds. The mining module identifies item 2 with access time of 30 seconds and item 3 with access time of 70 seconds as items that fall within the window size of 150 seconds and are each considered to have a temporal relation with item 1. Thus, pairs (item 1, item 2) and (item 1, item 3) are considered to follow a temporal pattern. Item 4 with an access time of 160 seconds falls outside the pre-defined window size of 150 seconds and is not considered to be relevant to the query. Similarly, items 3 and 4 have a temporal relation with item 2 and items pairs (item 2, item 3) and (item 2, item 4) are considered to follow a temporal pattern.

Using the example illustrated in FIG. 2, the algorithm generates an initial list of recommended items 130-A using the temporal relations associated with item 1. The initial list includes items 2 and 3. Item 4 from the user click stream is discarded/ignored from the recommended list for the query. The window size is exemplary and is not restrictive. As a result, it is easier to see that changing the window size would either increase or decrease the number of items that may be included within the initial list of recommended items. The single user click stream illustrated in FIG. 2 is for illustrative purpose to show how the mining module uses the temporal parameters to determine the temporal relation of the various items within the user click stream in generating the initial list of items. It should be understood that, in reality, the mining module will identify, obtain and analyze a plurality of user click streams from a multitude of user access logs related to the query to generate the initial list of recommended items 130-A. Further, the mining module will mine the plurality of user access logs periodically based on an update frequency, align the mined items based on pre-defined bin size and extract, analyze the user click streams so as to refine the generated initial list of recommended items.

Figure 1C:
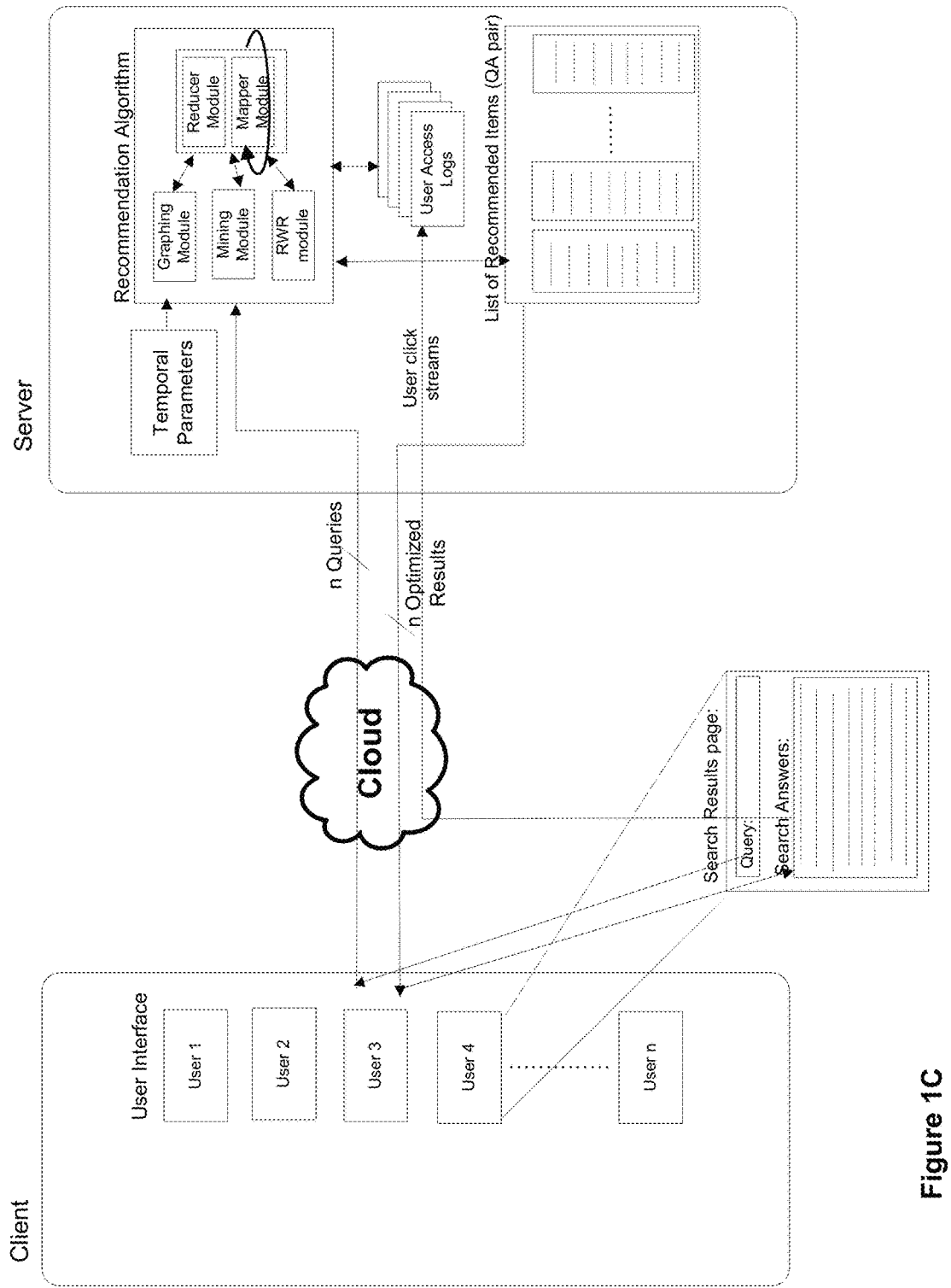
FIG. 1C illustrates a simplified block diagram of general process flow in a system and their interactions with one another, in one embodiment of the invention.

FIG. 1C illustrates a generic process flow in generating an optimal list of recommended items, in one embodiment of the invention. A plurality of users at a client-side generate query requests. The queries, represented as "n Queries" are forwarded to a recommendation algorithm at a server side through a network cloud, such as an Internet. The recommendation algorithm receives the queries as inputs, retrieves pre-computed lists of recommended items for each of the queries and returns the lists to the respective clients in response to the generated queries. To return specific pre-computed lists of recommended items for specific queries, the recommendation algorithm performs off-line processing as and when queries are received at the server-computing device. The off-line processing includes generating a list of recommended items for each query using the user access logs of a plurality of users, storing the list of recommended items for the queries in a storage device and periodically refining the list based on changes detected in the user access logs. The algorithm computes a list of recommended items for a query by retrieving temporal parameters from a temporal database and user access logs of a plurality of users related to the query to generate an optimal list of recommended items that follow a temporal pattern. The list of recommended items is refined and optimized iteratively. The algorithm returns the refined list of recommended items to the respective users at the client side as "n Optimized Results". The optimized results are presented in a search results page in a query-answer pair format. If the user is interested in a specific recommended item (presented as QA pair) from the list of recommended items rendered at the client, the user can click the specific recommended item to see the content of both question and answer. User interactions at the search results page is tracked and captured in the form of user click streams. The captured user click streams are updated to the user access logs for the query. The updated user access logs are used in refining the optimal list of recommended items stored in the storage device on an on-going basis by periodic mining based on the bin size and the window size.

Figure 3:
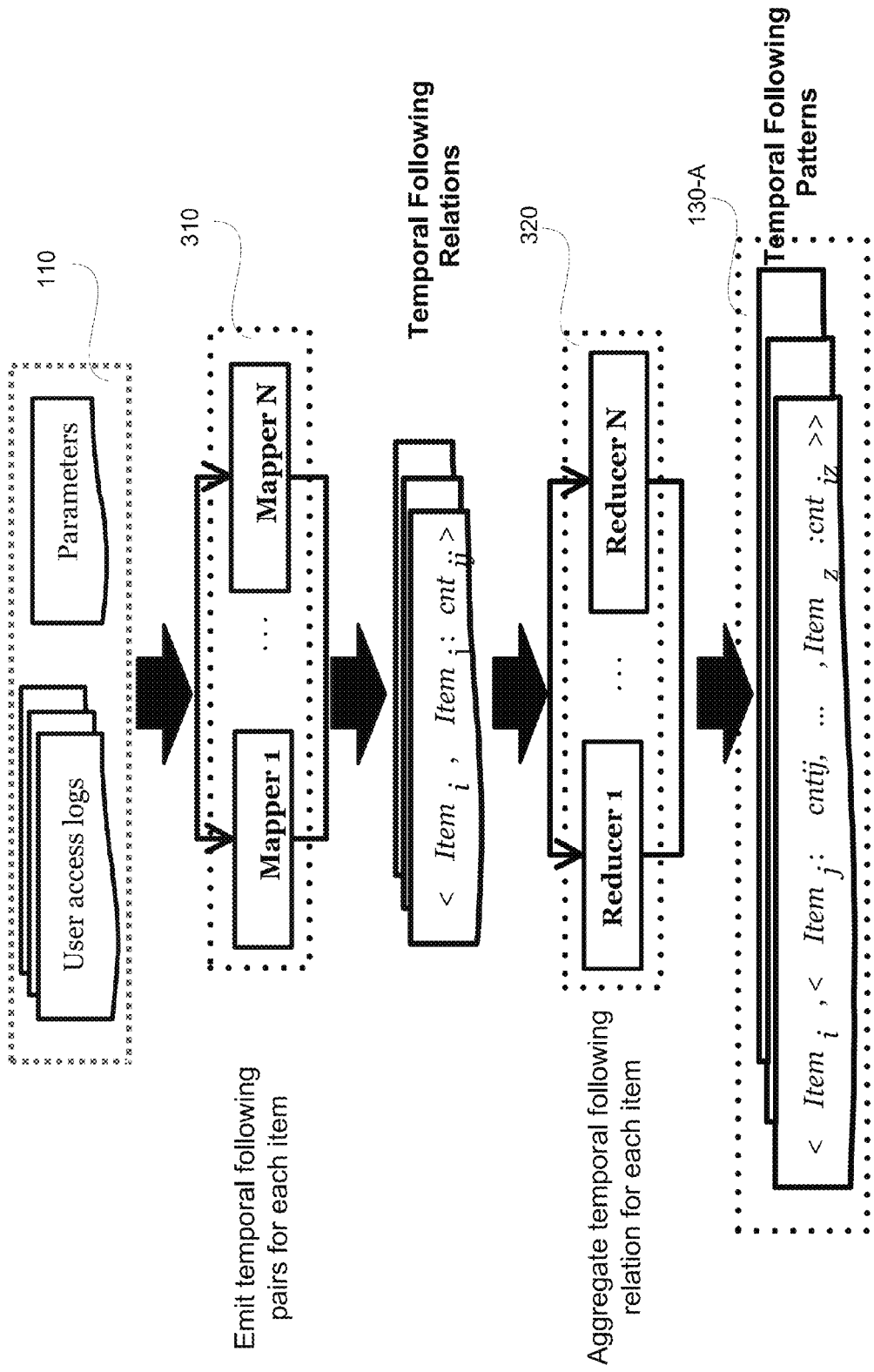
FIG. 3 illustrates an example of temporal following pattern mining for a query, in one embodiment of the invention.

FIG. 3 illustrates discovery of temporal pattern through parallel mining, in one embodiment of the invention. In order to achieve parallel mining, the mining algorithm 120-A includes a plurality of mapper modules, Mapper 1 through Mapper N, 310 and a plurality of reducer modules, Reducer 1 through Reducer N, 320, executing simultaneously. Each of the plurality of Mappers 310 reads user access log of a particular user that contains items related to the query, identifies a subset of items that are relevant to the query, analyzes the items in the subset of items using temporal parameters and generates one or more item pairs that have a temporal relation. From the example illustrated in FIG. 2 and applying to FIG. 3, a mapper module 310 (for example: Mapper 1) accesses the user access log of a user, extracts a subset of the items related to the query q into a user click stream, analyzes the user click stream and generates the item pairs, (item 1, item 2), (item 1, item 3), (item 2, item 3), (item 2, item 4), and (item 3, item 4).

Next, the reducer modules 320 collect all the item pairs discovered by the mapper modules 310 and organize the item pairs in the order of relevance into an initial list of items. In one embodiment, the reducer modules collect all the item pairs having temporal relation with a particular query item, item, wherein item, is the first variable. Thus, from the simple example illustrated in FIG. 2, a reducer module 320 (for example: Reducer 1) will collect all the item pairs discovered for query item 1, (item 1, item 2), (item 1, item 3), (item 2, item 3), (item 2, item 4) and (item 3, item 4) discovered by the mapper module 310 (Mapper 1) and selects the item pairs in which query item 1 is the first variable of the item pair. Thus, Reducer 1 320 will select only the item pairs, (item 1, item 2) and (item 1, item 3) from the list of item pairs discovered by Mapper 1 with reference to query item 1. Similarly, for query item 2, item pairs, (item 2, item 3) and (item 2, item 4) will be considered. It should be understood that the "query item" or "item" are used interchangeably herein to refer to query/answer pair. The reducer modules 320 then collectively organize the selected item pairs in the order of relevance to the query item into an initial list of recommended items 130-A. In one embodiment, each item includes the content of the query and an answer to the query described by a unique Web page. When the list of recommended items is presented at the client, each item in the recommended list is presented by the title of the query and an answer as a hyperlink to a corresponding Web page. When a user interested in a particular item, clicks the hyperlink to reach the Web page, the user interaction is captured in the user access log, which is updated to the user access log database. The updated user access logs are periodically mined to refine the pre-computed list of recommended items for the query.

In order to organize the selected item pairs, the reducer modules include logic to compute conditional counts for each of the selected item pairs and use the conditional count to collectively organize the selected item pairs. The conditional count for an item pair, in one embodiment, is defined as a function of the number of users accessing the second variable in the item pair immediately after accessing the first variable in the item pair. In one embodiment, the function is defined as a ratio of the number of users accessing the second variable in the item pair immediately after accessing the first variable to the number of users accessing the first variable in the item pair. For instance, consider item pair (item 1, item 2) discovered by the mapper modules. If 10 users accessed item 1 and only 5 of the 10 users also accessed item 2 immediately after accessing item 1, the conditional count for item pair (item 1, item 2), represented by $cnt_{12}$ is $5/10=1/2$ or 0.5. Similarly, considering item pair (item 1, item 3), if 10 users accessed item 1 and 7 out of the 10 users who accessed item 1 also accessed item 3 immediately after accessing item 1, the conditional count for the item pair (item 1, item 3), represented by $cnt_{13}$ is $7/10=0.7$.

It should be noted that the above mentioned function is one variation of computing the conditional count and that other variations for computing conditional count may also be engaged by the reducer modules. For instance, in one embodiment, the conditional count may be computed as a ratio of number of users who accessed a particular item, say $item_i$, initially also accessed a successive item, say $item_j$ after accessing item, irrespective of whether the users accessed $item_j$ immediately after accessing $item_i$ or sometime later but within the time period specified by the window size. For example, 10 users accessed item, and 7 of the 10 users who accessed $item_i$ also accessed $item_j$. In this example, 4 of the 7 users may have accessed $item_j$ immediately after accessing $item_i$ but the remaining 3 may have accessed $item_k$ or any other item after accessing $item_i$ before accessing $item_j$ but within the pre-defined window size. The reducer modules will consider the 3 users who accessed $item_j$ within the window size when computing the conditional count for the item pair ($item_i$, $item_j$), represented as $cnt_{ij}$. Thus, the conditional count $cnt_{ij}$ for the item pair ($item_i$, $item_j$) in this example will be $7/10=0.7$.

The reducer modules use the conditional count of each item pair related to the query item in order to organize the items in the initial list of recommended items by order of relevance to the query item. In one embodiment, the recommendation algorithm uses a computing mechanism available within the server-computing device to perform the computing process in generating the initial list of recommended items. Accordingly, the computing process includes two sub-tasks—a Mapper sub-task and a Reducer sub-task. The Mapper analyzes a plurality of user access logs to discover item pairs that match the query. The output from the Mappers is provided as inputs to the Reducers. In one embodiment, the computing mechanism may include a shuffler (not shown) to shuffle the output from the Mappers in a specific order before they are fed into the Reducers for further processing. In one embodiment, the shuffling order is user-specified. For instance, the shuffling order may be specified to be based on ID of items. In such a case, the shuffler would shuffle the item pairs discovered by the Mappers to organize the items such that all items in the item pairs with specific item ID as the first variable are grouped together in a shuffle list. Thus, with the example illustrated in FIG. 2, the shuffler would take the items pairs discovered by the Mappers, (item 1, item 2), (item 1, item 3), (item 2, item 3), (item 2, item 4) and (item 3, item 4) and generate a shuffle list for item 1 to include (item 1, item 2) and (item 1, item 3). Along same lines, the shuffler would generate a shuffle list for item 2 to include (item 2, item 3) and (item 2, item 4) and so on. The Reducers then uses the shuffle list to compute conditional count for each item in the shuffle list and sorts them into an order driven by the conditional count. The conditional count defines the relevance score of the item in relation to the query item. The ordered list generated by the Reducers is the initial list of recommended items 130-A organized in descending order of conditional count. Thus in one embodiment shown in the bottom of FIG. 3, the initial ordered list of recommended items 130-A for query item, item$_i$ are organized in decreasing order of relevance along with the corresponding conditional counts associated with each item in relation to the query item, item$_i$. The initial list of recommended items 130-A reflects the temporal following pattern of the items in relation to the query item.

Figure 4:
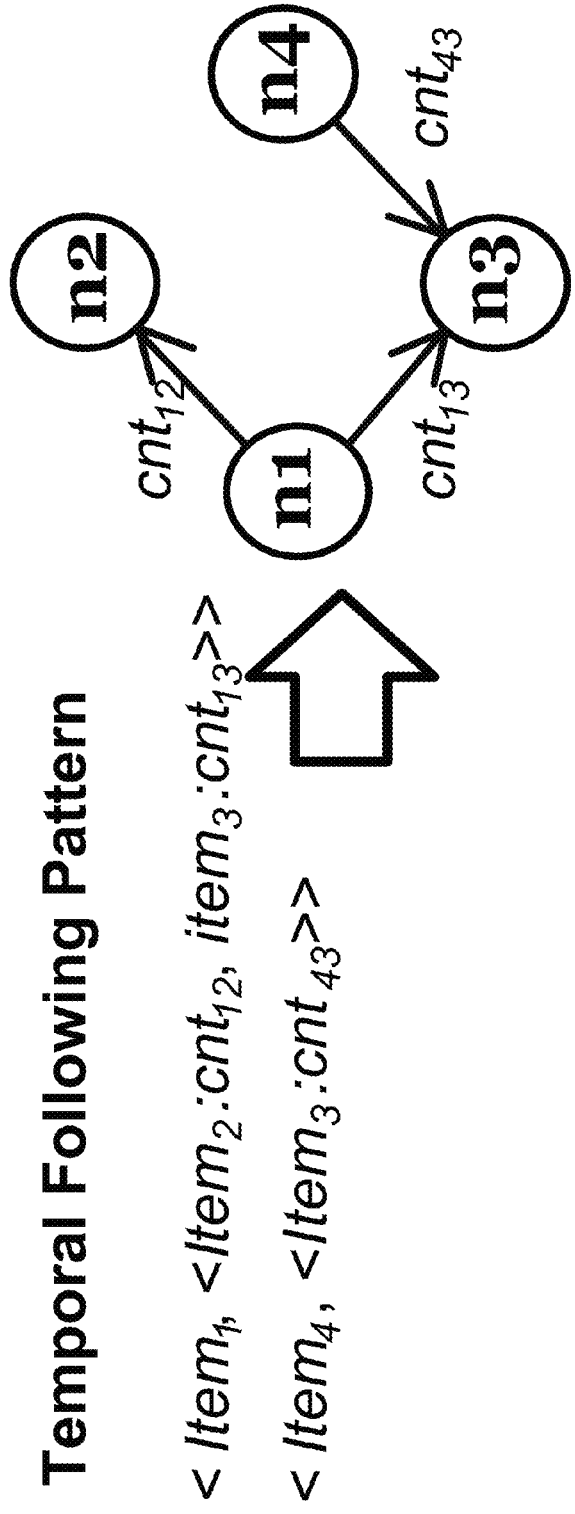
FIG. 4 illustrates a sample graph construction for a query, in one embodiment of the invention.

Returning to FIG. 1B, the initial list of recommended items 130-A is used as input to the graphing module 120-B. The graphing module 120-B is configured to generate a graph with a plurality of nodes and edges using the items from the initial list 130-A. Towards this end, the graphing module uses the temporal relation of each of the items in the initial list 130-A and the corresponding conditional count computed for each item for creating the graph. FIG. 4 illustrates a sample recommendation graph for a query item constructed by the graphing module 120-B using the temporal following pattern of the initial list of plurality of items generated by the reducer modules. Each node in the graph represents an item from the initial list of recommended items in relation to the query item and each node's location follows the temporal relation with other nodes as discovered by the mapper modules. The edges between the nodes are represented by the conditional count of the item pair as computed by the reducer modules. As illustrated in FIG. 4, we can see that item 1 in node 1 is followed by item 2 in node 2 and item 3 in node 3. Similarly, node 4 is followed by node 3. The edge between the nodes 1 and 2 represents the conditional count, $cnt_{12}$, edge between nodes 1 and 3 represents conditional count, $cnt_{13}$ and edge between node 4 and 3 represents conditional count, $cnt_{43}$, and so on. The graphing module generates graphs for each query item based on the temporal following pattern for that item as established by the mapper and reducer modules.

Figure 5A:
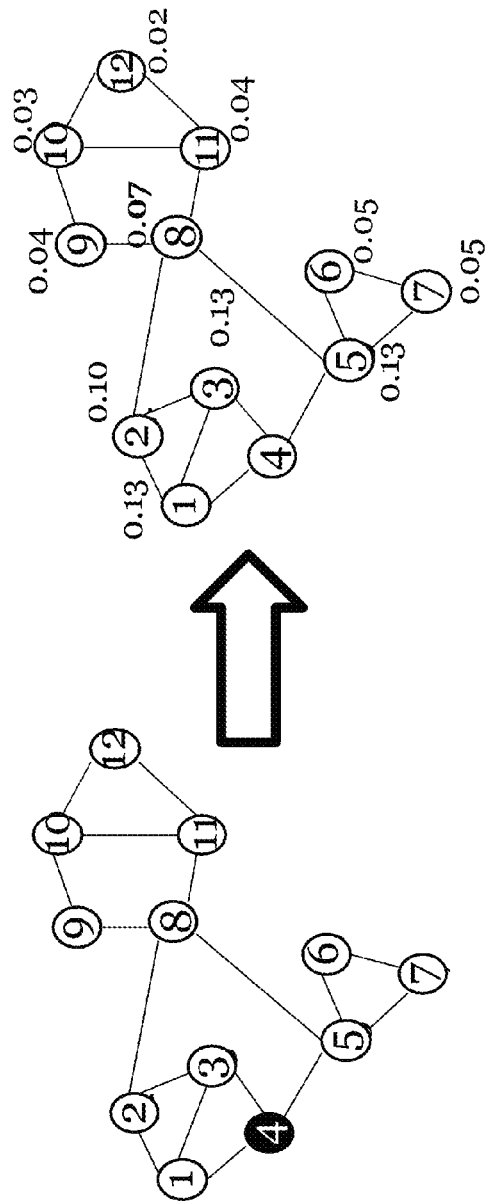
FIG. 5A illustrates a sample relevance score computation using random walk with restart mechanism for a single query using the generated graph, in one embodiment of the invention.
Figure 5B:
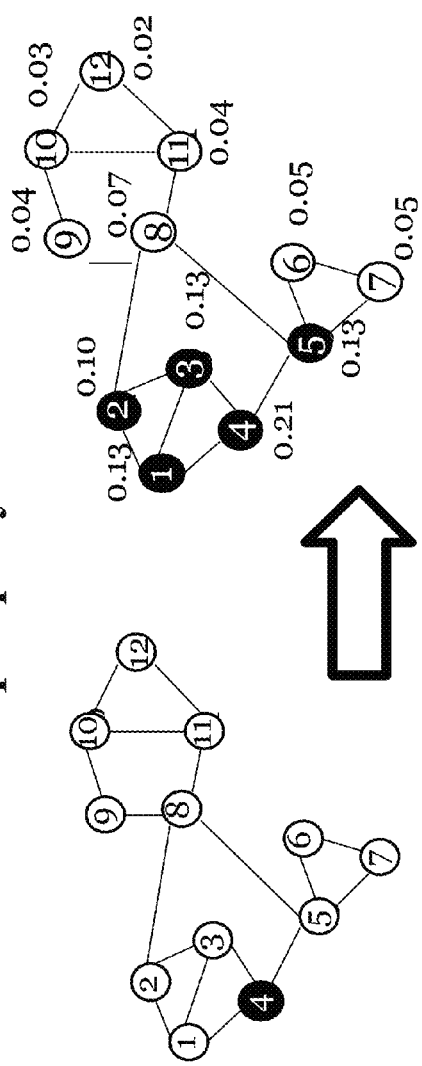
FIG. 5B illustrates a sample relevance score computation using random walk with restart mechanism for multiple queries, in one embodiment of the invention.
Figure 5B:
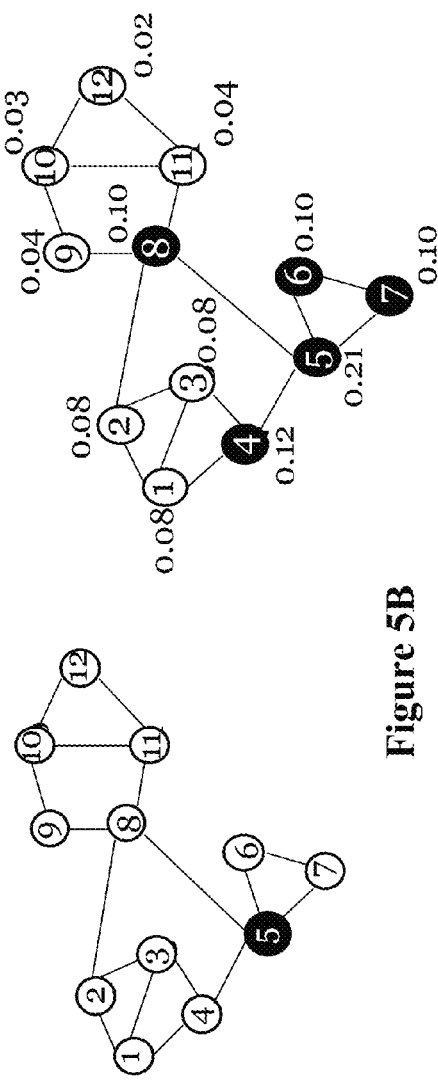

Referring back to FIG. 1B, after the recommendation graph has been constructed for a plurality of query items, a RWR module 120-C within the recommendation algorithm is used to refine the initial list of recommended items to generate a refined list of recommended items in response to the query. The RWR module 120-C is configured to use the graph generated by the graphing module to determine relevance score for each item in the graph. A sample relevance score computation for a query item using a graph generated for the item by the graphing module is shown in FIG. 5A. The example illustrated in FIG. 5A shows computation of relevance score for a single query item, item 4 represented by node 4. FIG. 5B illustrates an example wherein relevance score for multiple query items, items 4 and 5 represented by nodes 4 and 5, is computed simultaneously. FIG. 5B illustrates parallel processing used in computing the relevance score of multiple query items wherein each query item is represented by its own recommendation graph.

The process of computing the relevance score for a query item will now be described with reference to FIGS. 5A and 5B. The process of computing the relevance score for a single query item is described with reference to FIG. 5A, but can be easily extended to compute relevance score for multiple query items simultaneously, as illustrated in FIG. 5B. FIG. 5A illustrates a recommendation graph for an initial query item 4 and FIG. 5B illustrates recommendation graphs for initial query items 4 and 5.

Referring to FIG. 5A, it can be seen from the graph that nodes 1, 3 and 5 are directly connected to node 4 indicating that one or more users who accessed query item 4 (in node 4) also accessed query items 1, 3 or 5 immediately after accessing query item 4. Along same lines, query item 2 represented by node 2 was accessed immediately after the users accessed either query item 1 or query item 3, users who accessed query item 5 also accessed query items 6, 7 or 8 immediately after accessing item 5, and so on. Using the generated graph for initial query item 4, relevance score for each item is computed by first initializing the relevance scores of all query items represented in the graph. In one embodiment, the relevance score of query item 4, the head node or the initial query node, is initialized to 1 and the relevance score of all the other items in the graph are initialized to 0. Then, the relevance score of each item in the graph represented by corresponding nodes is computed through one or more iterations. A sample set of relevance scores for the various nodes in the graph for initial query node 4, after the first iteration is shown in FIG. 5A. FIG. 5B illustrates a sample set of relevance score for the various nodes in multiple graphs, graphs for initial query nodes 4 and 5, computed in parallel after the first iteration.

Figure 6A:
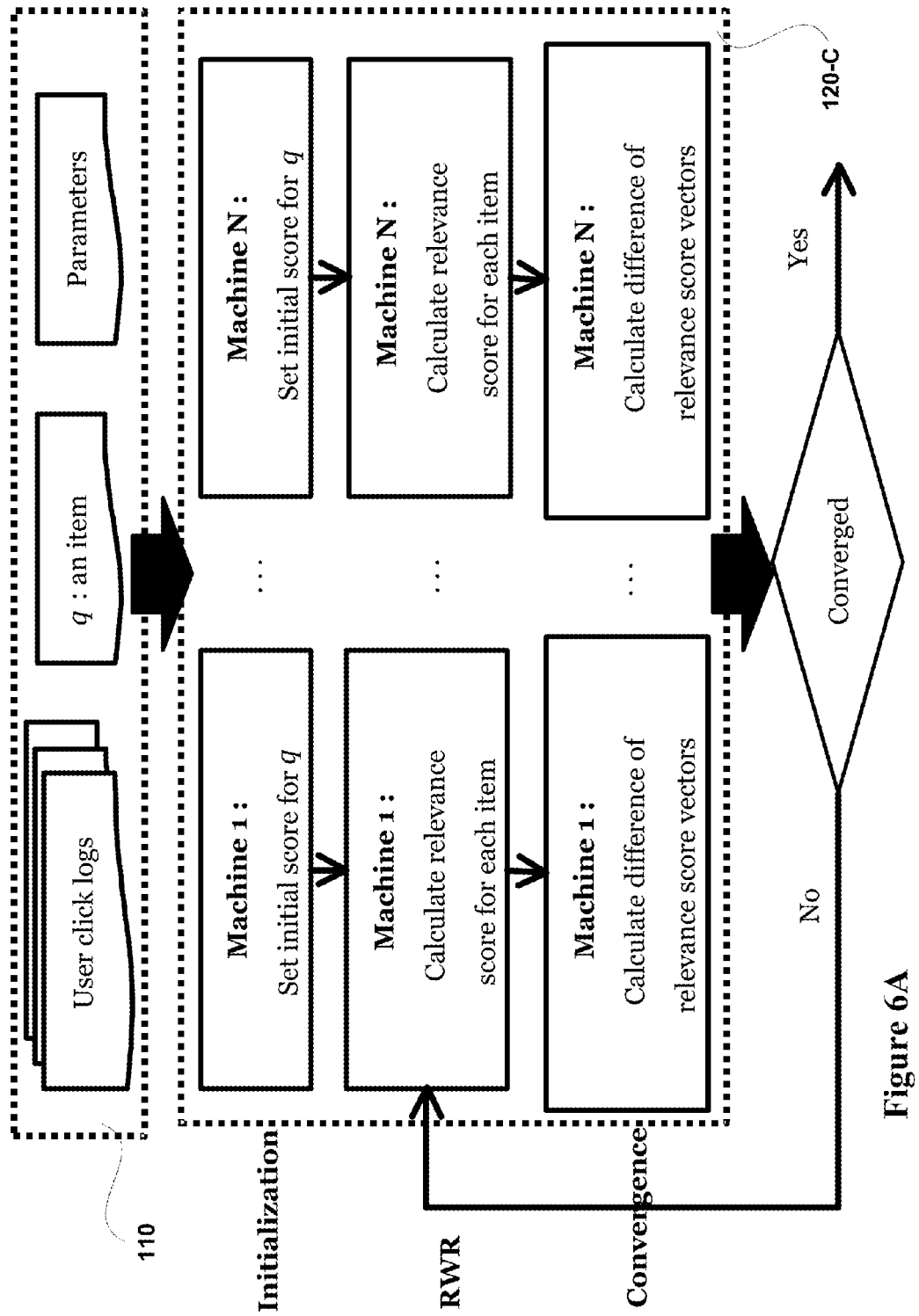
FIG. 6A illustrates a sample process flow using random walk with restart mechanism executing in parallel to compute the relevance score for a single query, in one embodiment of the invention.

As mentioned with reference to FIG. 5B, the computation of the relevance scores for the various nodes in a plurality of recommendation graphs may be accomplished through multiple iterations using parallel processing. FIG. 6A illustrates a process flow for paralleling RWR through multiple iterations for single query, in one embodiment of the invention. As shown, the RWR module uses the graph from the initial list generated by the mining module for an initial query item q, user click logs and temporal parameters, and computes the relevance score of the items in the graph in parallel. Accordingly, the relevance score computation for each node in the graph is assigned to a different machine/processor and each of the machines/processors calculates the relevance score for the specific node assigned to it. For instance, in one embodiment illustrated in FIG. 6A, node 12 may be assigned to machine/processor 1, node 10 may be assigned to machine/processor 2, node 4 to machine/processor 3, etc., and each of the machines/processors will compute the relevance score of the assigned node independently and simultaneously with other machines/processors. This form of computing relevance score is fast and saves sufficient computation time.

The process of relevance score computation begins with the initialization step as illustrated in FIG. 6A, wherein each of the machines will set relevance score of the query item represented by the node and assigned to the particular machine to an initial score. The machines then compute the relevance score for the assigned nodes iteratively, as illustrated in the "RWR" step of FIG. 6A. As the computation of the relevance score goes through iterations, the relevance score of the initial query node will start diffusing to other nodes in the graph and the relevance score of the initial query node will start decreasing. The iterative computation of the relevance score is to ensure that the relevance score of each item converges to a stable value. After each iteration of computing, the relevance score of each node assigned to a particular machine is compared with the previous relevance score for that node and a difference of the two consecutive relevance scores for that node is computed, as illustrated in the "Convergence" step of FIG. 6A. If there is no difference in the two consecutive relevance scores or if there is negligible difference (defined by a user or pre-defined) or if the difference is below a threshold value, it is established that the relevance score for that node has converged to a stable value, as defined by the decision step in FIG. 6A. In such a case, the node is assigned the relevance score from the last iteration. If, after each iteration, the difference is above the threshold value or significant, then the relevance score computing for that node goes through another round of iteration, as indicated by the arrow going back to the "RWR" step in FIG. 6A and the process repeats.

The iterative computation to converge the relevance score to a stable value can be best defined using the following example. Referring to the example illustrated in FIG. 2, suppose the relevance score results after the first iteration is <(node 1: 0.8), (node 2: 0.1), (node 3: 0.1)>. The relevance results are defined in the (node number, relevance score) format. After the second iteration, let us suppose that the relevance score result is <(node1: 0.75), (node2: 0.15), (node3: 0.1)>. Then, the difference between these two consecutive iterations is obtained by summing the difference of relevance scores for each item from the two iterations. In this example, the difference of the first and the second iterations is 0.05 (node1)+0.05 (node2)+0 (node3)=0.1. Suppose the pre-defined convergence threshold is defined to be 0.2. Given the convergence threshold to be 0.2, the difference of relevance score value of all items is 0.1, which is less than the threshold. In this case, based on the results, the items after the second iteration are considered to have converged to a stable value.

Referring to FIG. 6A, the three steps, initialization/RWR/convergence, are implemented by using computing mechanism having Mapper and Reducer sub-tasks. The Mappers take the results from the first and second iteration for each item as input and outputs data in the form of <item, relevance score>. For instance, from the above example, for node1, the Mapper will produce two records: <node1, 0.8> and <node1, 0.75> respectively after the two consecutive iterations. Then, a shuffle mechanism within the computing mechanism collects the two values for node 1: 0.8 and 0.75 and forwards the two values associated with item 1 to the Reducers as input where the difference between the two values is computed. For node1, based on the input, the reducer outputs the difference of 0.05. Processing each node in this way, the difference scores corresponding to each node in the graph is obtained. The difference scores for all nodes in the graph are summed up to obtain total difference score for the query node represented in the graph. This total difference score is compared against a specified convergence threshold to determine if the node has converged to a stable value. The iterative computing of the relevance score for each node is continued till the relevance score for the respective nodes converge to a stable value or the number of iterations meets a pre-defined limit.

Figure 6B:
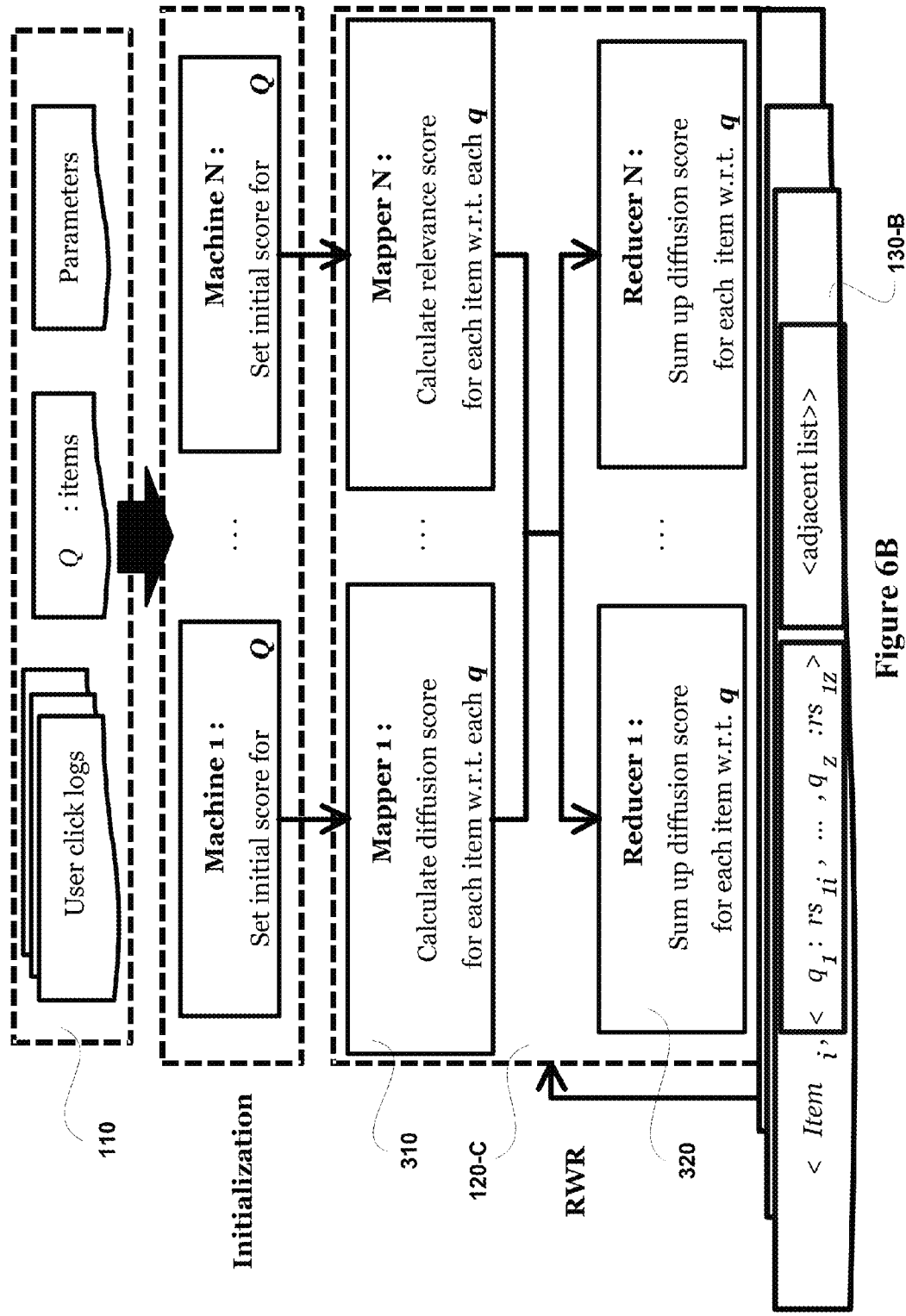
FIG. 6B illustrates a sample process flow using random walk with restart mechanism executing in parallel to compute the relevance score for multiple queries, in one embodiment of the invention.

In the case of single query represented in FIG. 6A, a single total difference score value is used to determine if the relevance score has converged to a stable value. This is because the result from the RWR is associated with the single query item. In the case of multiple queries represented in FIG. 6B, it is possible that each query item can converge at different times, meaning, each query item can converge after different number of iterations. The embodiments are not restricted to one particular way of computing convergence of relevance score as depicted in FIGS. 6A and 6B. For instance, in one embodiment of the invention, in order to simplify the computation, the convergence verification operation can be replaced by a maximum iteration parameter. The Mappers and Reducers can go through the iterative computation of the relevance scores till the number of iterations exceeds the maximum iteration specified in the maximum iteration parameter. Irrespective of the process used, the convergence of the nodes defines the respective relevance scores that are used in refining the pre-computed initial list of recommended items for the query.

In one embodiment, the relevance score of the nodes in the graphs illustrated in FIGS. 5A and 5B are computed by calculating diffusion score of each of the items iteratively. FIG. 6B illustrates process flow for computing diffusion scores iteratively and in parallel and for determining the relevance scores of each item in the graphs for multiple query items using RWR algorithm. As mentioned earlier, the computed relevance score is then used in refining the pre-computed initial list of recommended items resulting in a more refined pre-computed list of recommended items. The refined pre-computed list of recommended items for the query is stored in a storage device and periodically updated to reflect changes to the users navigation behavior for the query captured in the respective users' access logs. When a subsequent request for the query is received at the server-computing device, the algorithm identifies and returns this refined, pre-computed list of recommended items to the client for rendering. In one embodiment, the diffusion score identifies the propagation of the relevance score from the initial query node to the successive nodes of the graph within a pre-determined time window based on user behavior. A sample diffusion score algorithm used to compute the diffusion score of each of the items in the graphs shown in FIG. 5B, is shown in equation 4 in FIG. 7. In equation 4 of FIG. 7, q indicates the query node, and $A_{q,i}$ indicates the relevance score of node i in response to query node, q. Equation 4 computes the relevance score that diffuses from node i to node j. The diffusion of the relevance score from node i to node j occurs in two different ways. According to the first way, node j receives relevance score value propagating from neighbor node i directly via the edge shared between the two nodes; and in the second, node j, itself being a query node q, may receive the relevance score value propagating from node i via jumps (or restarts) depending on node j happening to be a query item. FIG. 7 also shows a relevance score algorithm in equation 5 used in computing the relevance score of the nodes. As shown, equation 5 defines the relevance score of node j in response to the query node q, which is calculated by summing scores propagated from all nodes $v_i$ in the graph to node j via edges or restarts (if node j happens to be the query node q itself).

Referring back to FIG. 6B, the diffusion score for each node of each graph, in one embodiment, is calculated using mapper modules in parallel and the relevance score is calculated using the reducer modules. The process begins with the initialization step where the mapper modules within a plurality of machines initialize the diffusion scores of each of the nodes in a plurality of graphs for different initial item queries. The mapper modules then compute the diffusion score of each of the nodes within each of the respective query item's graphs. The parallel computing using multiple machines is similar to the one described with reference to FIG. 6A but for multiple queries. After the first iteration of diffusion score computation, the reducer module computes the relevance score for each item as a sum of the diffusion score for that item. Based on the diffusion scores and the relevance scores for each item, the reducer modules collectively generate a refined list of recommended items in response to the query. The refined list of recommended items 130-B includes the initial item and the list of items that users have accessed after accessing the initial item in response to previous queries in the order of relevance. The refined list of recommended items is arranged in a decreasing order of relevancy for the query.

The impact of the diffusion of the relevance scores to adjacent nodes in the graph can be better understood with reference to FIG. 5A. As illustrated in FIG. 5A, it can be seen from the example that the relevance score for initial query item 4 has changed from an initial score of 1 to 0.21. The difference in the relevance score can be attributed to the diffusion of the relevance score to the adjacent nodes in the graph. It should be noted herein that the total of the relevance scores of all the nodes at any time is equal to 1. The number of iterations for computing the relevance score depends on the node and the threshold value set for the nodes. The refined list represents the most popular set of items that users navigated to previously in response to the query. The most popular set of items to a plurality of users implies that these set of items are also the most relevant items to the query. This refined, pre-computed list of items is returned to the user in response to a subsequent query.

Figure 8:
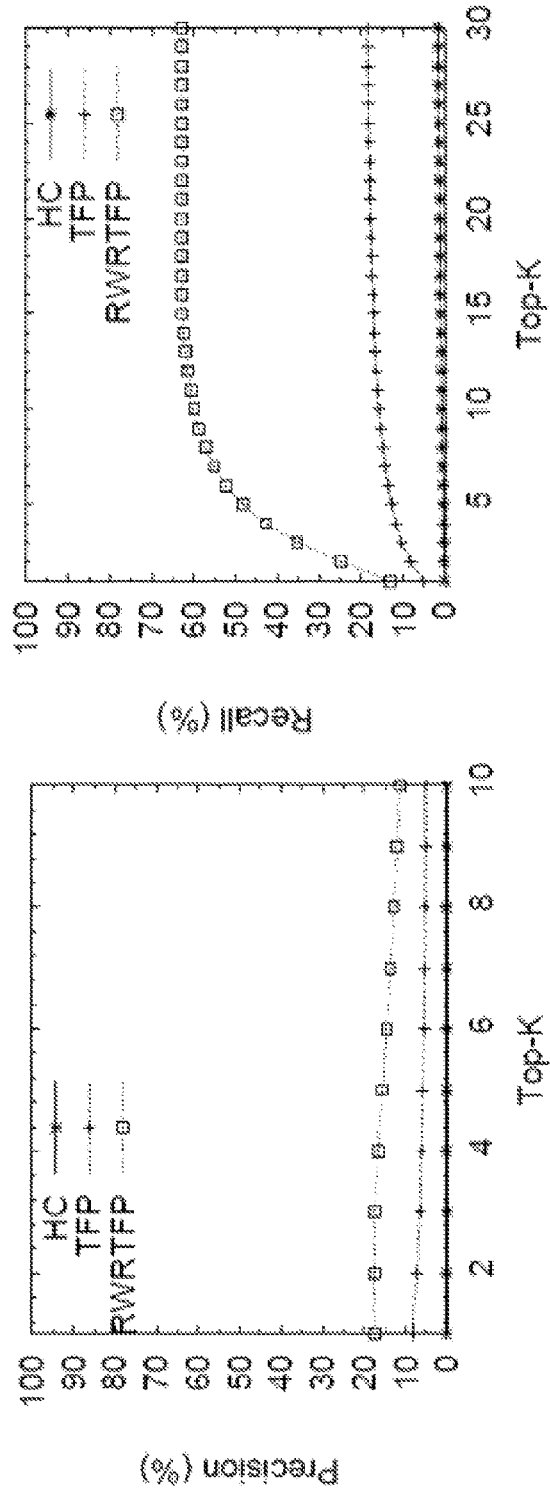
FIG. 8 illustrates quality study results upon implementation of the recommendation algorithm, in one embodiment of the invention.

FIG. 8 illustrates the result of a quality study conducted based on the implementation of the recommendation algorithm, in one embodiment of the invention. As can be seen from the graph, the random walk with restart (RWR) based on temporal following pattern (TFP) provides higher item precision and higher item recall for the recommended list of items substantiating the fact that the recommendation algorithm using the RWR together with TFP suggests items of greater relevance to the query.

Figure 9:
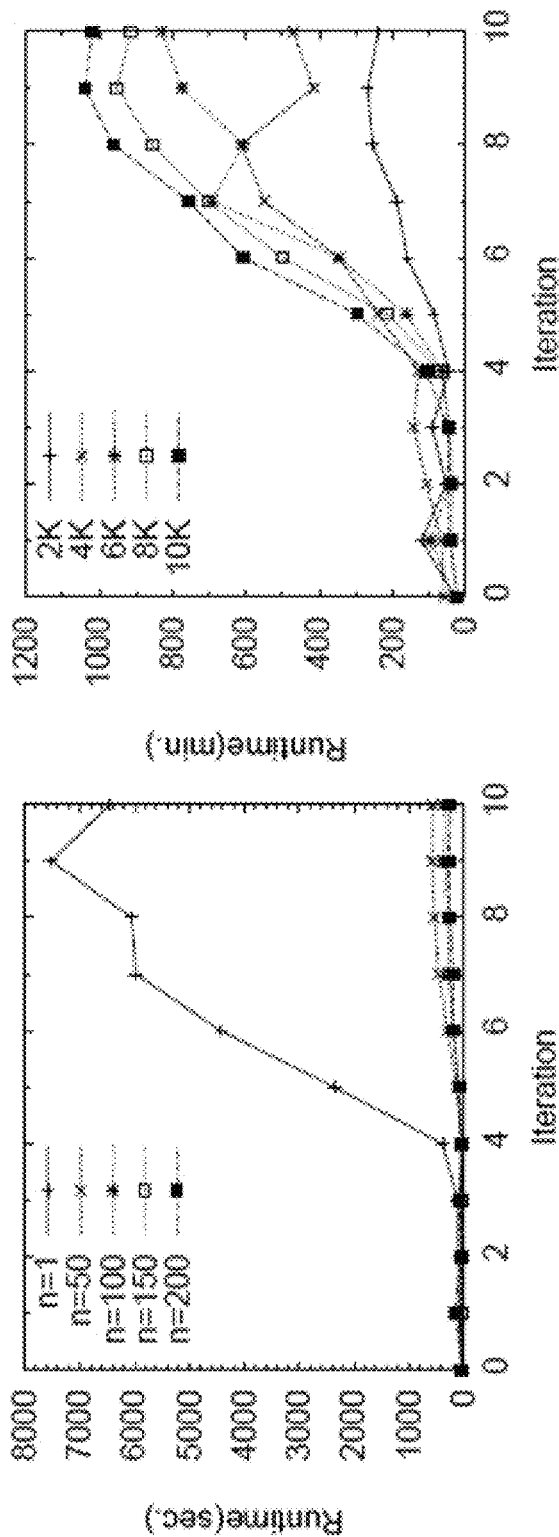
FIG. 9 illustrates scalability study results upon implementation of the recommendation algorithm, in one embodiment of the invention.

FIG. 9 illustrates the results of a scalability study based on the implementation of the recommendation algorithm. The graph illustrates how much time the algorithm consumes and how large a data set it can process. As can be seen from the graph, the computational cost incurred by the recommendation algorithm is significantly reduced as the number of machines engaged in performing the analysis increases. Similarly, the efficiency of the algorithm can be measured in terms of computational cost of processing the queries. It is seen from the graph in FIG. 9, that the computational cost is inversely proportional to the number of queries. Thus, as the number of queries increase, on average the computational cost in terms of computation time per query decreases suggesting an increased efficiency of the algorithm. For example, as illustrated in FIG. 9, the computation time per query for 2 k queries is about 0.74 seconds whereas the computation time per query for 10 k queries is about 0.49 seconds.

The algorithm provides an efficient, cost-effective recommendation tool for generating an optimal list of recommended items that are most relevant to the query. The algorithm relies on users browsing behavior rather than on the actual context, which can vary based on, for instance, the language of the query or geography. The list of items that are recommended in response to the query, as a result of implementation of the algorithm, are of a higher precision and higher recall.

In one embodiment, a method for providing a list of recommended items that represents a most optimal list for the query is disclosed. The method includes obtaining user navigation information relevant to the query from a plurality of user access logs associated with a plurality of users. The user access logs capture navigation sequences that are followed by the plurality of users for a plurality of queries. The navigation sequences represent the users browsing behavior and identify answers to each of the plurality of queries. A set of temporal parameters defining time frame for analyzing the user navigation information is identified. An initial list of recommended items to navigate in response to the query is dynamically generated. The initial list of recommended items is obtained by mining user navigation information using the temporal parameters to identify a subset of items relevant to the query. Each of the items in the initial list of recommended items is presented as a pair constituting the query and a corresponding answer to the query. A recommendation graph is dynamically generated for the query using the items from the initial list of recommended items. The relevancy of each of the items in the initial list of recommended items is identified through one or more iterations. The relevancy of the items is determined by computing relevance score for each of the items in the initial list of recommended items and verifying that the computed relevance score for each of the items has converged to a stable value through one or more iterations. The initial list of recommended items is dynamically refined using the computed relevance score of each of the items to generate a refined list of recommended items. The refined list of recommended items defining the optimal result for the query is returned for rendering in response to the query.

Figure 10:
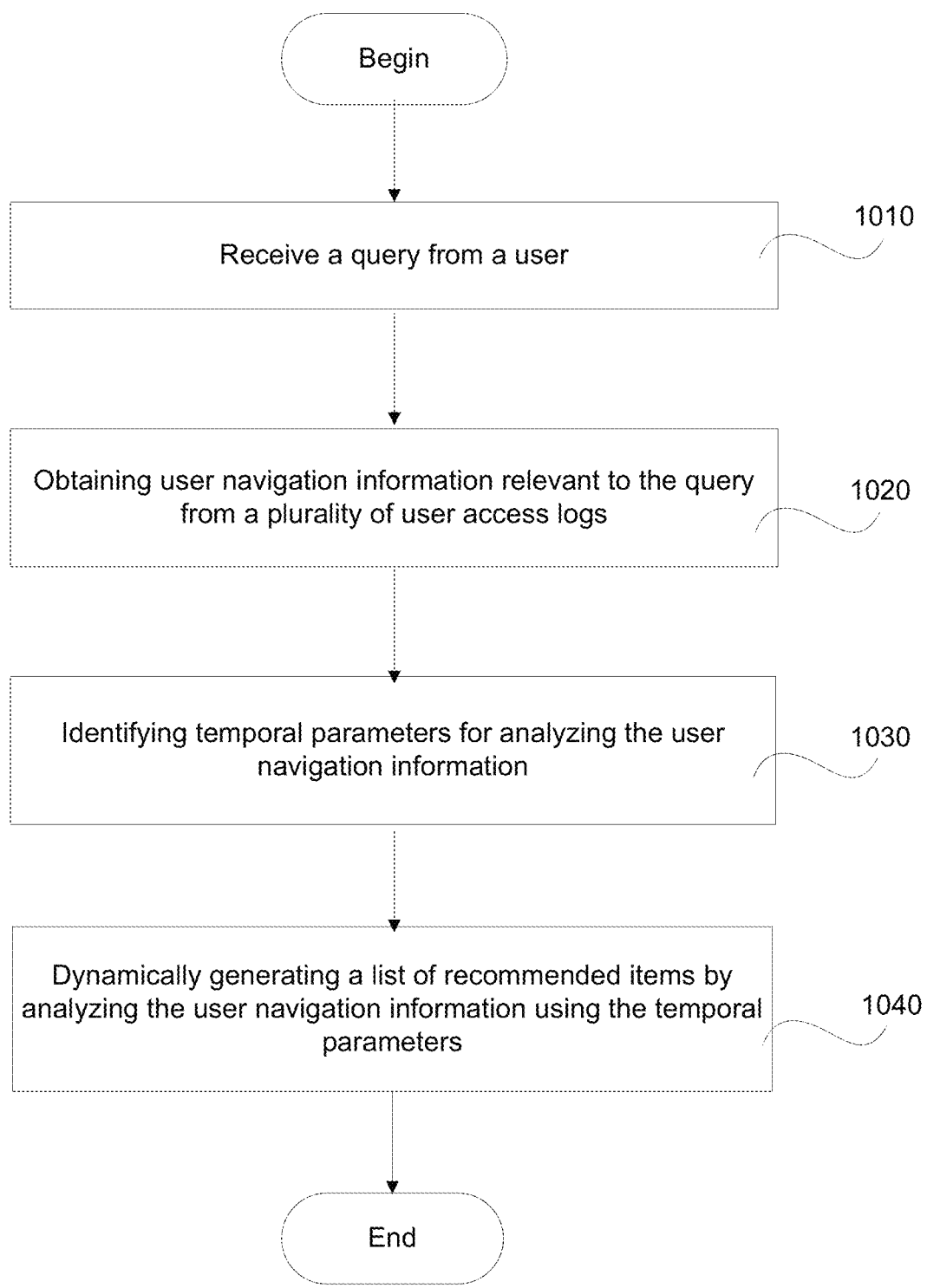
FIG. 10 illustrates an operations flow chart for providing a recommended list of items for a query, in one embodiment of the invention.

With the above detailed description of the algorithm, a method for generating a pre-computed list of recommended items will now be described with reference to FIG. 10, in one embodiment. The process begins with a recommendation algorithm executing on a processor of a server receiving a query from a client device, as illustrated in operation 1010. In response to the query, the recommendation algorithm seeks and obtains navigation information related to the query from a plurality of user access logs distributed and available to/accessible by the algorithm from the server, as illustrated in operation 1020. The navigation information related to the query identifies a navigation sequence followed by a plurality of users in relation to the query and is extracted as user click streams from the user access logs. In addition to seeking and obtaining navigation information, the algorithm identifies a set of temporal parameters for analyzing the navigation information of the plurality of users, as illustrated in operation 1030. The temporal parameters may be pre-defined and may or may not vary based on the type of query. The temporal parameters define, among other things, a window size and a bin size. The window size defines the time frame for analyzing the navigation information of the users and the bin size defines a calibration unit for scaling a raw time-stamp associated with each of the entries in the navigation information obtained from the user access logs of the plurality of users (e.g., given bin size "5", a raw time-stamp "53" is mapped to the corresponding scale "51~55"). The algorithm uses the window size of the temporal parameters to dynamically analyze the user click streams of the plurality of users that define the temporal pattern to identify temporal relation of the items within the user click streams related to the query. The algorithm generates an initial list of recommended items based on this analysis and refines this list through further iterative analysis.

The iterative analysis may include dynamically mining the navigation information to obtain an up-to-date navigation information of the users based on the bin size and using the newly mined navigation information to further dynamically refine the list of recommended items. The iterative analysis may also include further refining the navigation information to ensure that each of the items have stabilized over a period defined by the window size. The refined list of recommended items identifies the most relevant and most popular item set for the query based on a plurality of users past navigation behavior. The refined list of recommended items are pre-computed for each query received at the server and is stored in a storage device. The process concludes with the identification and return of the relevant pre-computed refined list of recommended items to the client in response to the query.

Figure 11:
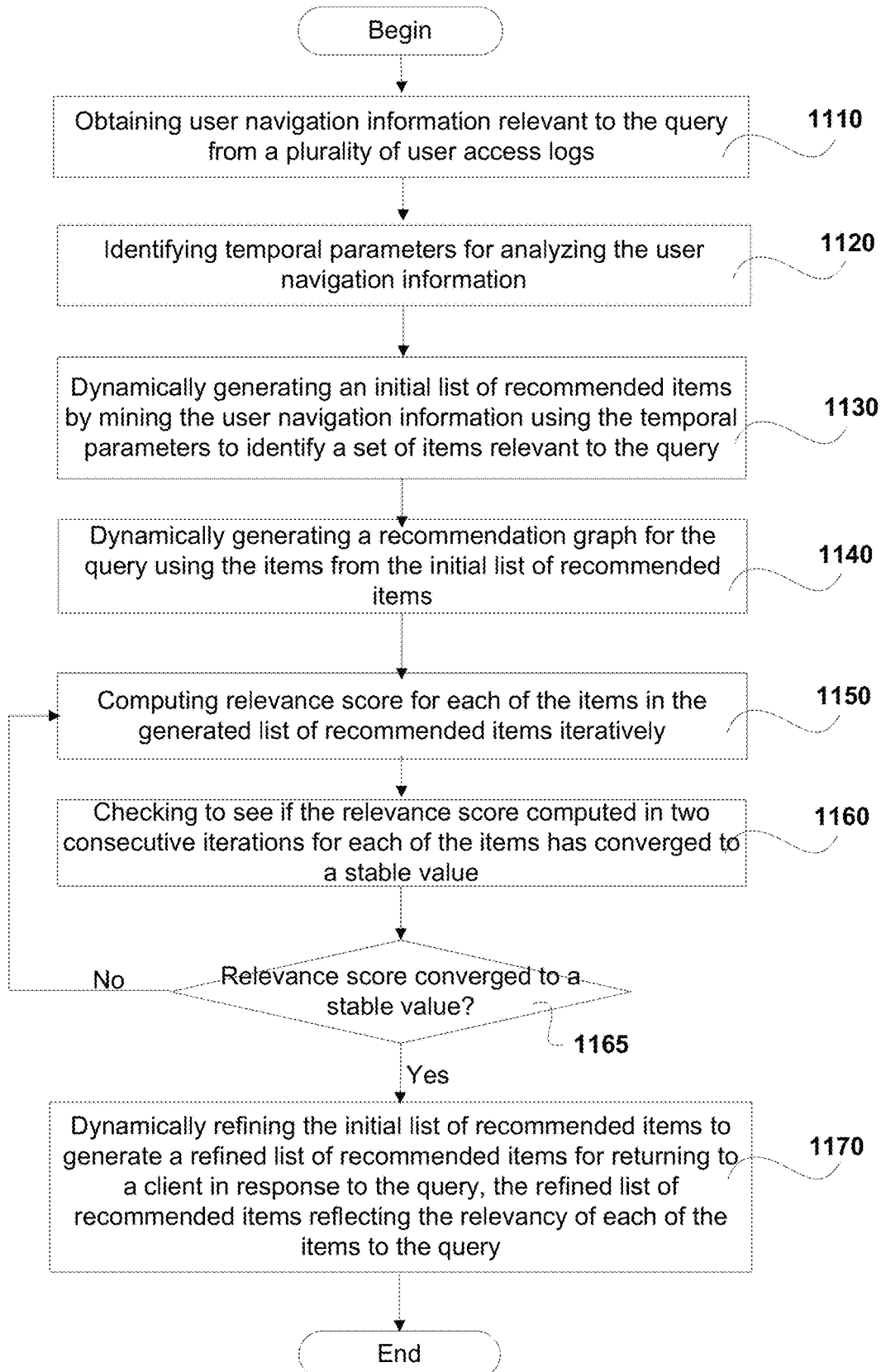
FIG. 11 illustrates an alternate flow chart of operations for providing a recommended list of items for a query, in another embodiment of the invention.

FIG. 11 illustrates an alternate embodiment of a method for generating a pre-computed list of recommended items for a query and returning the relevant list in response to a subsequent query received from a user. The method begins at operation 1110 wherein a recommendation algorithm obtains navigation information of a plurality of users from user access logs wherein the navigation information is relevant to a query received at the server. The algorithm receives the query from a server and parses a plurality of user access logs to identify user access logs that include items that are relevant to the query. The algorithm extracts the navigation information from the identified user access logs into a plurality of user click streams wherein the user click streams include a plurality of items represented in the form of a query/answer pair. The items in the user click streams define the temporal behavior of the users in relation to the query. The algorithm also identifies a set of temporal parameters that includes at least a window size and a bin size for analyzing the items within the user click streams extracted from the user access logs, as illustrated in operation 1120. The algorithm generates an initial list of recommended items by dynamically analyzing the items in the user click streams using the window size and the bin size of the temporal parameters, as illustrated in operation 1130. The analysis identifies all the items that have a temporal relation with the initial query item.

The recommendation algorithm then uses the items in the initial list to dynamically generate a recommendation graph, as illustrated in operation 1140. In order to generate the recommendation graph, the algorithm first computes conditional count for each of the items that have temporal relation with the query item within the initial list. The recommendation graph is then generated with a plurality of nodes and edges connecting the nodes. The nodes in the recommendation graph represent items from the initial list and the edge connecting any two nodes represents the corresponding conditional count associated with the items connected by the edge.

After generating the recommendation graph, the algorithm computes relevance score for each of the items in the recommendation graph iteratively, as illustrated in operation 1150. The computed relevance scores are checked to determine if they converge to a stable value, as illustrated in operation 1160. The algorithm may use a plurality of mappers and reducers to perform the iterative computation of the relevance scores for the items, in one embodiment. In this embodiment, the mappers are used to compute the relevance score for the items and the reducers are used to determine if the relevance scores have converged to a stable value. The reducers determine the convergence of relevance scores by calculating the difference in the relevance scores of each item from two consecutive iterations and checking to see if the difference is negligible, very low or under a threshold value as illustrated by decision box 1165. The threshold value may be pre-defined by a user. If the difference in the relevance score for an item is negligible or under a threshold value, the algorithm determines that the relevance score for the item has converged to a stable value, as illustrated by the "Yes" option for decision box 1165. In such a case, the reducer in the algorithm uses the relevance score to determine which of the items in the initial list are relevant to the query and refines the initial list of items to obtain a refined list of items, as illustrated in operation 1170. The refined list of items identifying the most popular and relevant items is returned to the client device in response to the query.

If, on the other hand, the difference in the relevance scores for the items are above a threshold value, then it is determined that the relevance scores for the items in the recommendation graph have not converged to a stable value, as illustrated by "No" branch of decision box 1165. In such a case, the algorithm rolls back to operation 1150 to perform additional iteration of computing the relevance score of the items and the process continues till either the relevance scores have converged or maximum number of iterations has been met. Upon the completion of the iterations, the pre-computed initial list is refined to include updates to items contained within based on the respective items relevance scores.

In one embodiment, the initial list of items is refined using a ranking algorithm that ranks the items within the list into an order of relevance that is most relevant to the query. For instance, the ranking algorithm may rank a node with a transition item lower than a node with a destination item. A transition item, as used in this application, is defined as an item accessed by a user that is in-between an initial query item and a final destination item. The transition item can be identified using the access time associated with the various items in the nodes and the navigation sequence of the user. In this instance, the ranking algorithm looks at the timestamps of user access logs to identify the transition items and destination items and use this information in generating a refined and ranked list of recommended items from the initial list. The refined list is stored in a storage device and periodically updated to reflect all the changes in the user access logs for the query. The process concludes with the pre-computed and stored ranked list being returned to the client device in response to a subsequent query received from the client device.

As can be seen from the above description of the various embodiments, the recommendation algorithm generates a pre-computed list of recommended items that are most relevant and popular to a plurality of users by relying on the navigation behavior of users rather than relying on context. The context/domain dependence of the conventional algorithms resulted in item lists that could not be ported across all domains as they were mostly tied to the geography or language, etc. The embodiments of the invention, on the other hand, extend beyond the geographical/domain or language limitations making it easy to port across all domains. Other advantages of the algorithm may be easily envisioned by one skilled in the art.

It will be obvious, however, to one skilled in the art, that the present invention may be practiced without some or all of these specific details. In other instances, well known process operations have not been described in detail in order not to unnecessarily obscure the present invention.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations can include the physical transformations of data, saving of data, and display of data. These operations are those requiring physical manipulation of physical quantities. Usually, though not necessarily, these quantities take the form of electrical or magnetic signals capable of being stored, transferred, combined, compared and otherwise manipulated. Data can also be stored in the network during capture and transmission over a network. The storage can be, for example, at network nodes and memory associated with a server, and other computing devices, including portable devices.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for providing a list of items in response to a query, comprising:
    accessing user navigation information relevant to the query from a plurality of user access logs associated with a plurality of users, wherein the user access logs provide log entries identifying items presented as pairs constituting the query and corresponding answers to the query, each answer representing a search result selected for the query, the user navigation information defining a navigation sequence followed by each of the plurality of users for the query within a search session, based on the respective user's sequence of selection of search results presented for the query;
    identifying temporal parameters for analyzing the user navigation information, the temporal parameters include at least a window size that is predefined, wherein the window size defines a time frame in the search session for determining the respective user's selection pattern for the query and for filtering the search results;
    generating a list of items for the query by analyzing the navigation sequence provided in the user navigation information of the plurality of users for the query using the temporal parameters, the analyzing includes organizing the items in the list in accordance to sequence of selection such that each item in the list of items has a following relation with at least one other item in the list as determined from the user access logs, wherein the following relation is established when access time of the item and the at least one other item in the list falls within the window size, the list of items stored in a storage device for subsequent retrieval,
    wherein establishing following relation further includes, for each item in the list,
        computing a diffusion score in relation to the other items in the list;
        performing an iterative computation of a relevance score as a function of the diffusion score till the relevance score converges to a stable relevance score value; and
    returning the answer from each item in the list of items in response to the query while continuing to periodically refine the list of items stored in the storage device, the refining of the list of items reflecting users' current navigation behavior for the query.

2. The method of claim 1, wherein accessing user navigation information further includes,
    extracting a plurality of items from each of the identified user access logs matching the query, the plurality of items representing user navigation information of each of the plurality of users.

3. The method of claim 1, wherein the temporal parameters further includes,
    a bin size for mining the user navigation information, wherein the bin size defines a calibration unit for scaling a raw time-stamp associated with each of the items within the user navigation information.

4. The method of claim 1, wherein generating a list further includes,
    performing a selection pattern mining of the items extracted from the list of items for the query, the selection pattern mining defining the following relation of the items navigated by the plurality of users;
    generating a recommendation graph for each of the items obtained from the selection pattern mining, the recommendation graph having a plurality of nodes and an edge connecting each pair of nodes wherein each of the plurality of nodes represents an item from the list of items; and
    computing a relevance score for each of the nodes in the recommendation graph, the relevance score defining the relevancy of the item in the respective node to the query.

5. The method of claim 1, wherein generating the list further includes,
    for each item in the list of items, determining time lapsed between the accessing of the item and each of a plurality of successive items based on user navigation information obtained from the user access logs, wherein the time lapsed defines access time between the item and each successive item;
    identifying successive items from the list of items with access times within the window size defined in the temporal parameters, the identified successive items having a temporal relation with the item based on the users navigation behavior; and
    generating the selection pattern for the item that includes the identified successive items.

6. The method of claim 5, further includes,
    computing a conditional count for each of the identified successive items in the selection pattern, wherein the conditional count is a function of the number of users accessing a particular successive item after accessing the item.

7. The method of claim 4, wherein generating a list further includes, building the recommendation graph with the item and successive items as nodes based on the following relation, the nodes connected by edges, wherein an edge between any two nodes is represented by a corresponding conditional count.

8. The method of claim 4, wherein computing relevance score further includes,
   initializing the relevance score for each node in the recommendation graph;
   computing a diffusion score for each item with respect to other items within the recommendation graph, wherein each item is represented by the corresponding node in the recommendation graph; and
   computing the relevance score iteratively for each item represented by the corresponding node in the recommendation graph as a function of the diffusion score.

9. The method of claim 8, wherein the relevance score for the node is computed iteratively till the node's relevance score converges to a stable relevance score value, wherein the iterative computing of relevance score for the node further includes,
   determining a first relevance score and a second relevance score for each of the nodes starting from a root node in the recommendation graph, the first and the second relevance scores defining the relevance scores of the related item represented by each node after two consecutive iterations of computing;
   obtaining difference between the first and the second relevance scores for each of the items in the recommendation graph;
   computing a sum of the differences of all the items in the recommendation graph; and
   declaring convergence of the items in the recommendation graph for the root node related to the query when the sum of the difference between the first relevance score and the second relevance score is below a threshold value.

10. The method of claim 4, wherein generating the list further includes,
    ranking the items represented by the nodes using the relevance score of the items and a ranking algorithm; and
    arranging the items in the list in the order of ranking of the relevance score.

11. The method of claim 1, wherein establishing following relation further includes,
    generating a recommendation graph for each item in the list, the recommendation graph having a plurality of nodes and an edge connecting each pair of nodes, each of the nodes represents an item from the list of items such that access time of the item in a root node and another item in the recommendation graph falls within the window size;
    computing the diffusion score for each item in relation to other items in the recommendation graph; and
    performing the iterative computation of the relevance score for each item in the recommendation graph as a function of the diffusion score for the respective item till the relevance score converges to the stable relevance score value, wherein the stable relevance score value is indicative of convergence of search results of a root node for the query.

12. A computer-implemented system configured to execute a recommendation algorithm on a processor, the recommendation algorithm includes program instructions to provide a list of items for a query, the recommendation algorithm comprising:

a temporal pattern mining module having program instructions to access and analyze a plurality of user access logs of a plurality of users using temporal parameters to identify a plurality of items that match the query, the temporal parameters identify a window size for analyzing the user access logs and to identify a following relation of the plurality of items in each user access log, the window size is predefined and defines a time frame for determining selection pattern of each of the plurality of users for the query during a search session captured within each user access log, the window size used for filtering the identified plurality of items that match the query, wherein each item represents the query and a corresponding answer to the query in a query/answer pair, the answer represents a search result for the query, the identified plurality of items reflecting selection patterns established by the plurality of users' sequence of selection of the search results presented in response to the query;

a graph execution module having program instructions to generate a graph using the identified plurality of items, the graph having a plurality of nodes and a plurality of edges connecting the nodes, the graph execution module configured to compute conditional count for each pair of nodes in the graph, wherein each of the nodes in the graph represents an item and each edge connecting any two nodes represents the conditional count associated with the two nodes; and a random walk module having program instructions to compute relevance score for each of the nodes in the graph as a function of a diffusion score, wherein the diffusion score is computed in relation to other nodes in the graph, the computed relevance score defining relevancy weight of the item associated with the node to the query, the computed relevance score being iteratively refined till the relevance score converges to a stable relevance score value, the converged relevance score used to identify items that are most relevant for inclusion in the list of items, wherein the list of items represents results for the query, wherein each of the items in the list of items is identified based on a following relation with at least one other item in the list of items, wherein the following relation is determined by access time of the at least one other item in the list in relation to access time of an item, such that the access time of the item and the at least one other item in the list falls within the window size, and wherein the system includes a memory to store the program instructions of the recommendation algorithm and the processor executes the program instructions.

13. The computer-implemented system of claim 12, wherein the temporal pattern mining module further includes,
    a mapper module having program instructions configured to discover item pairs that follow the temporal pattern; and
    a reducer module having program instructions configured to compute conditional count for each of the item pairs discovered by the mapper module, the reducer module further configured to organize the item pairs.

14. The computer-implemented system of claim 13, wherein the reducer module further includes a ranking algorithm to rank and organize the item pairs in a sequence.

15. The computer-implemented system of claim 12, further configured to execute a plurality of recommendation algorithms simultaneously, the simultaneous execution of the recommendation algorithms enables analyzing the user navigation information for a plurality of queries and generating a plurality of lists for the plurality of queries.

16. A method for providing a list of search results in response to a query, comprising:
retrieving prior user navigation information relevant to the query from a plurality of user access logs associated with a plurality of users, wherein the user access logs provide log entries identifying items presented as pairs constituting the query and corresponding answers to the query, each answer representing a search result for the query, the user navigation information defining a navigation sequence followed by each of the plurality of users during a search session based on the respective user's selection of search results presented for the query, the navigation sequence used to establish a selection pattern of the plurality of users for the query;
identifying temporal parameters for analyzing the user navigation information, the temporal parameters include at least a window size that is predefined, wherein the window size defines a time frame in the search session for determining the respective user's selection pattern for the query during the search session and is used for filtering the search results;
generating a list of search results for the query by analyzing the navigation sequence of the search results provided in the user navigation information using the window size of the temporal parameters, the analyzing includes organizing the items in the list in accordance to sequence of selection such that each search result in the list has a following relation, in accordance with the temporal parameters, with at least one other search result in the list, wherein the following relation is established when access time of the search result and the at least one other search result in the list falls within the window size,
wherein establishing following relation further includes, for each search result in the list,
computing a diffusion score in relation to the other search results in the list;
performing an iterative computation of a relevance score as a function of the diffusion score till the relevance score converges to a stable relevance score value; and
returning the list of search results, for presenting, in response to the query while continuing to periodically update the generated list of search results stored in a storage device using information retrieved from the user access logs, the updated list of search results reflecting users' current navigation behavior for the query.

17. A method for optimizing an order of presenting search results, comprising:
accessing a plurality of access logs for a plurality of users, the access logs defining a selection pattern that identifies an order of selecting the search results, wherein the plurality of access logs include entries identifying items for a plurality of queries, with each item represented as a pair constituting a query and a corresponding search result for the query, wherein each query is associated with a plurality of selection patterns obtained from a plurality of users;
identifying a temporal parameter that defines at least a window size, the window size is predefined and defines a time frame for determining selection pattern for the query during each search session, the window size used for selecting the search results for the query to define the selection patterns that are most relevant to the query, such that only the selected search results are considered for processing;
for a received query, generating a list of search results that are ordered based on processing of the selection patterns of a plurality of users identified for the time frame defined by the window size for the received query, the selection patterns identifying which of the search results should be placed in higher priority in the list of search results relative to other search results, wherein the selection pattern is determined by access time of one or more subsequent search results in relation to access time of a first search result, such that the access time of the first search result and the one or more subsequent search results falls within the window size,
wherein each of the search results in the list is identified and prioritized by,
computing a diffusion score in relation to other search results in the list;
performing an iterative computation of a relevance score as a function of the diffusion score till the relevance score converges to a stable relevance score value; and
returning data defining the list of search results and information usable for organizing the search results within the list, in response to the received query,
wherein method operations are performed by a processor.

18. The method of claim 17, further includes generating a plurality of list of search results for a plurality of queries simultaneously.

19. The method of claim 17, further includes,
generating a recommendation graph for each of the search results obtained from the selection pattern, the recommendation graph having a plurality of nodes and plurality of edges connecting the nodes wherein each of the nodes represents a search result from the list of the search results; and
computing a relevance score for each of the nodes in the recommendation graph, the relevance score defining the relevancy of the search result in the nodes to the received query.

20. The method of claim 17, wherein generating the list of search results further includes,
for each search result in the selection pattern for the received query associated with a specific user obtained from the one or more of the plurality of access logs of the specific user, determining time lapsed between accessing the search result and each of a plurality of successive search results, wherein the time lapsed defines access time between the search result and each successive search result; and
identifying successive search results from the selection pattern with access times within the window of time defined in the temporal parameters.

21. The method of claim 20, wherein generating a list further includes,
building a recommendation graph with the identified search result and the successive search results as nodes based on the selection pattern, the nodes connected by edges, wherein the edge between any two nodes is represented by a corresponding conditional count, wherein the conditional count for any two nodes is a function of the number of users accessing a particular search result represented in a successive node after accessing the search result represented in a preceding node;

computing a relevance score for each of the nodes in the recommendation graph, the relevance score defining the relevancy of the search result in the nodes to the received query, wherein computing relevance score further includes, initializing the relevance score for each node in the recommendation graph;

computing a diffusion score for each search result with respect to other search results within the recommendation graph, wherein each search result is represented by the corresponding node in the recommendation graph;

calculating the relevance score iteratively for each search result represented by the corresponding node in the recommendation graph as a function of the diffusion score, wherein the iterative calculation of the relevance score is performed till the node's relevance score converges to a stable relevance score value, the iterative calculation of relevance score for the node includes, determining a first relevance score and a second relevance score for each of the nodes in the recommendation graph, the first and the second relevance scores defining the relevance scores of the related item represented by each node after two consecutive iterations of computing;

obtaining difference between the first and the second relevance scores for each of the search results in the recommendation graph;

computing a sum of the differences of all the search results in the recommendation graph; and declaring convergence of the search results in the recommendation graph for a root node related to the query when the sum of the difference between the first relevance score and the second relevance score is below a threshold value.

\* \* \* \* \*